United States Patent [19]

Whipple

[11] Patent Number: 5,077,733
[45] Date of Patent: * Dec. 31, 1991

[54] PRIORITY APPARATUS HAVING PROGRAMMABLE NODE DWELL TIME

[75] Inventor: David L. Whipple, Braintree, Mass.

[73] Assignee: Wang Laboratories, Inc., Lowell, Mass.

[*] Notice: The portion of the term of this patent subsequent to May 15, 2007 has been disclaimed.

[21] Appl. No.: 405,792

[22] Filed: Sep. 11, 1989

Related U.S. Application Data

[63] Continuation-in-part of Ser. No. 317,100, Feb. 28, 1989, Pat. No. 4,926,419, which is a continuation-in-part of Ser. No. 97,775, Sep. 17, 1987, abandoned, which is a continuation-in-part of Ser. No. 712,492, Mar. 15, 1985, Pat. No. 4,719,622.

[51] Int. Cl.$^5$ ............................................. H04L 5/22
[52] U.S. Cl. .................................. 370/85.6; 370/85.11; 340/825.5
[58] Field of Search ..................... 370/85.1, 85.2, 85.4, 370/85.5, 85.6, 85.9, 85.11; 340/825.05, 825.5, 825.51

[56] References Cited

U.S. PATENT DOCUMENTS

| | | |
|---|---|---|
| 4,232,294 | 11/1980 | Burke et al. |
| 4,320,502 | 3/1982 | deVeer |
| 4,336,480 | 12/1982 | Van Hatten |
| 4,559,595 | 12/1985 | Boudreau et al. |
| 4,583,089 | 4/1986 | Cope |
| 4,626,843 | 12/1986 | Szeto et al. |
| 4,663,756 | 5/1987 | Retterath |
| 4,719,622 | 1/1988 | Whipple et al. |
| 4,763,122 | 8/1988 | Franaszek |
| 4,814,974 | 3/1989 | Narayanan et al. ................ 370/85.6 |
| 4,926,419 | 5/1990 | Whipple ........................... 370/85.11 |

OTHER PUBLICATIONS

IBM Technical Disclosure Bulletin, vol. 20, No. 2, D. F. Bantz.

Primary Examiner—Douglas W. Olms
Assistant Examiner—Melvin Marcelo
Attorney, Agent, or Firm—Michael H. Shanahan

[57] ABSTRACT

Apparatus for determining priority of access to a bus by nodes in a group of nodes attached to the bus. For purposes of determining priority, the apparatus arranges the nodes in a circular configuration and selects one of the nodes as the "anchor node". The anchor node has the highest priority and the priorities of the other nodes are determined by their positions in the circle relative to the anchor node. Each node includes a presettable counter for indicating a number of times that a node may access the bus before the highest priority is rotated to another node. After a device represented by one of the nodes accesses the bus for a predetermined number of accesses the current anchor node ceases being the anchor node and the next node in the circle becomes the new anchor node. The priorities of the nodes change to reflect the new location of the anchor node.

19 Claims, 10 Drawing Sheets

PRIORITY APPARATUS HAVING PROGRAMMABLE NODE DWELL TIME

CROSS REFERENCE TO RELATED APPLICATIONS

The present application is a continuation-in-part of U.S. Ser. No. 07/317,100, Priority Apparatus, filed Feb. 28, 1989 now U.S. Pat. No. 4,926,419 which in turn is a continuation-in-part of U.S. Ser. No. 07/097,775, filed Sept. 17, 1987 (now abandoned) which was a continuation-in-part of U.S. Ser. No. 06/712,492, System Bus Means for Inter-Processor Communication, filed Mar. 15, 1985 and now U.S. Pat. No. 4,719,622, issued Jan. 12, 1988.

BACKGROUND OF THE INVENTION

1. Field of the Invention

The present invention relates to apparatus used in computer systems to determine which of a plurality of devices which share a bus is to have access to the bus at a given instant and more particularly to apparatus in which access is determined by assigning priorities to the device and wherein a device gaining a highest priority to the bus, the anchor node, is granted a programmable number of bus accesses before relinquishing the highest priority to another device.

2. Description of the Prior Art

When a plurality of devices in a computer system share a bus, the computer system must include some way of preventing more than one of the devices from using the bus at once. One technique used in the prior art is to assign each device a static priority; if a device with a high priority and one with a low priority both attempt to access the bus, the device with the higher priority wins. One way of assigning priorities, shown in FIG. 5, is by position. FIG. 5 is a conceptual drawing of a static daisy chain 501. A set of nodes 503, each one of which may provide access to a bus 504 for one or more devices, is arranged in daisy chain fashion, with a priority bus (PB) 507 connecting adjacent members of the chain. The leftmost node 503(1) in the chain has the highest priority, and each succeeding node 503 has a lower priority than the one preceding it. Thus, if node 503(1) and another node 503(a) request access simultaneously, node 503(1) receives the access. For purposes of the present discussion, daisy chain 501 may be regarded as having a static "anchor" 505 which marks the point from which all priorities are determined. While static daisy chain 501 successfully determines which of the nodes 503 will have access to the bus at a given time and has the important advantage that the node 503 having priority gains immediate access to bus 504, it does not prevent higher-priority devices from "hogging" bus 504 and denying access to the bus to lower-priority devices. For example, if node 503(1) requests access to the bus on each bus cycle, no other node 503 in chain 501 will ever gain access to the bus 504.

The "hogging" problem may be eliminated if each node is guaranteed a turn at the bus. One way of doing this is disclosed in U.S. Pat. No. 4,342,995, *Data Network Employing a Single Transmission Bus for Overlapping Data Transmission and Acknowledgement Signals*, inventor George T. Shima, issued Aug. 3, 1982. In the system disclosed in that patent, the nodes are daisy-chained together in a loop and a pulse is circulated around the loop. When a node which has a pending bus access request receives the pulse, it gains access to the bus. When the node is finished, it provides the pulse to the next node. If the node which receives the pulse does not wish to access the bus, it holds the pulse for a short time and then passes it to the next node in the chain. While the system of Shima guarantees that none of the nodes will "hog" the bus, it is extremely inefficient in a situation in which one of the nodes uses the bus much more frequently than the other nodes. Once a node in the system of Shima has finished using the bus, it must always wait to begin its next bus access until the pulse has been passed to all of the other nodes on the chain, even though none of the other nodes has a bus access request pending.

What is needed, and what is provided by the invention which is the subject of the present application, is bus priority apparatus which neither permits a single node to "hog" the bus nor requires a node to wait to gain access to the bus when no other node has a request pending. Furthermore, the invention provides that once a node gains the highest bus priority that it maintains the highest priority over the other bus nodes for a programmable number of bus access cycles before relinquishing the highest priority to another node.

SUMMARY OF THE INVENTION

The present invention concerns dynamic circular bus priority apparatus in which each of the nodes connected to the bus has a present priority which is determined by its position in a circular configuration of the nodes relative to one of the nodes which is currently the "anchor node" of the circle. When more than one of the nodes attempts to access the bus simultaneously, the node which gains access is determined by the present priority of the nodes. Furthermore, once a node gains the anchor node priority it retains the highest priority for a programmable number of bus accesses before relinquishing the highest priority to another node. After the programmable number of bus accesses a node other than the current anchor node becomes the anchor node, and the priorities of the nodes are determined by their positions relative to the new anchor node. The invention thus permits the node which presently has priority immediate access to the bus after the expiration of the programmable number of accesses allocated to the node previously having priority and at the same time prevents any node from hogging the bus, and thereby overcomes the problems of the prior art mentioned above.

In a presently-preferred embodiment, each node becomes the present anchor node in sequence. Each time a node gains the anchor position of the bus the node retains the anchor position for a programmable number of bus access cycles made by the node afterwhich the node following the current anchor node becomes the new anchor node. In other embodiments, the next anchor node may be determined by the last node to have gained access to the bus. In such an embodiment, the node following the last node to have gained access becomes the new anchor node, thus guaranteeing that the node which last accessed the bus has the lowest priority for the next access.

It is thus an object of the invention to provide an improved digital computer system.

It is a further object of the invention to provide improved apparatus for determining priority of access to a bus.

It is another object of the invention to provide apparatus for determining priority of access to a bus in which the node which presently has priority can access the bus immediately but no node can "hog" the bus.

It is an additional object of the invention to provide priority apparatus in which priority is determined by the position of a node relative to a current anchor node whose position in the system changes with each access to the bus.

It is a still further object of the invention to provide priority apparatus in which a node gains a highest bus priority for a predetermined number of bus access cycles before relinquishing the highest priority to another node.

Other objects, advantages and features of the present invention will be understood by those of ordinary skill in the art after referring to the following detailed description of the preferred embodiment and drawings, wherein:

DESCRIPTION OF A PREFERRED EMBODIMENT

Figure 1:
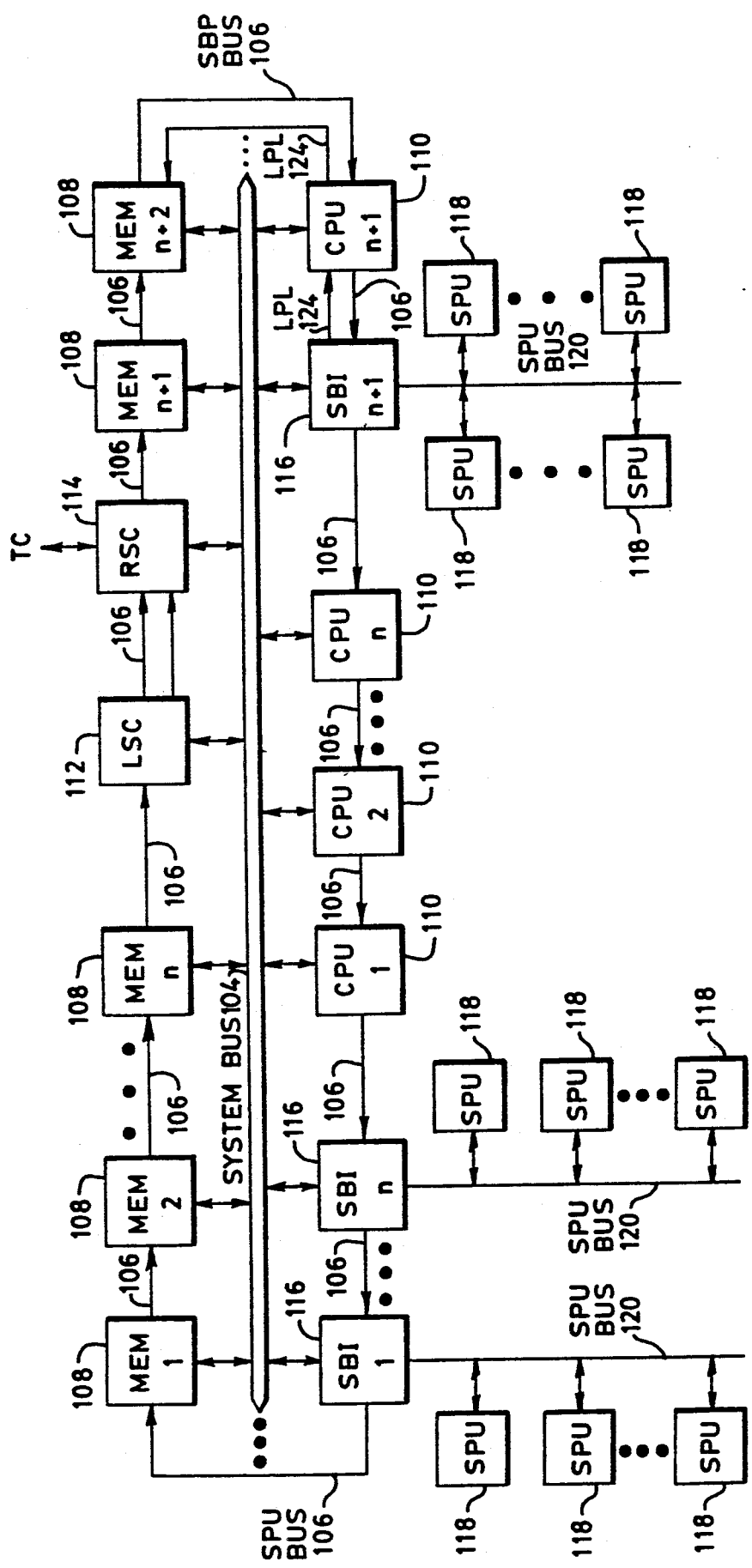
FIG. 1 is a block diagram of a system incorporating the present invention.

Parts A through F of the following Description of a Preferred Embodiment describe the system in which the priority apparatus of the present invention is implemented. The priority apparatus itself is more nearly described in Parts G and H. A presently preferred embodiment of the invnetion is set forth in Part I. It should be noted that reference numbers appearing in the drawings and in the following descriptions are comprised of three digits. The two least significant (rightmost) digits identify a particular element appearing in a particular drawing and the most significant (leftmost) digit identifies the figure in which that element first appears. For example, element 124 is the 24th element appearing in FIG. 1 and first appears in FIG. 1. A reference numbers is assigned the first time the reference element appears in the descriptions and is used refer to that element throughout the following descriptions and drawings.

A. Elements of System 102 and General Operation (FIG. 1).

Referring to FIG. 1, therein is presented a block diagram of an exemplary System 102 incorporating the inter-processor bus structure of the present invention. As shown therein, the two primary elements of the system bus structure that are visible at this level are System Bus 104 and System Bus Priority (SBP) Bus 106. System Bus 104, the detailed structure of which is described further below, is the means by which the elements of System 102 communicate with one another. SBP Bus 106, also described in detail below, is the link through which the elements connected from System Bus 104 determine access to System Bus 104.

As shown in FIG. 1, the elements comprising System 102 fall into two classes, those which are connected directly to System Bus 104 and SBP Bus 106 and those which are connected indirectly to System Bus 104, that is, through another element which in turn is connected directly to System Bus 104 and SBP Bus 106. As described further below, elements directly connected to System Bus 104 and SBP Bus 106 are fundamentally regarded as a peers with regard to access to System Bus 104, that is, each such element has equal priority of access to System Bus 104 with respect to all other such elements. The access priorities of indirectly connected elements are determined by the access priorities of the associated elements through which they are connected to System Bus 104. Considering first the elements connected directly to System Bus 104, each such element includes sufficient internal intelligence, for example, in the form of microcode control, to perform at least specialized functions independently of the other elements of System 102. Examples of such elements, as illustrated in FIG. 1, includes Memory Units (MEMs) (1 to n+2) 108, Central Processing Units (CPUs) (1 to n+1) 110, Local System Controllers (LSC) 112, Remote System Controllers (RSC) 114, and System Bus Interfaces (SBIs) (1 to n+1) 116.

The design of and functions performed by elements such as MEMs 108 and CPUs 110 are well known in the art and require no further description. LSC 112 and RSC 114 may, for example, be small computers of the personal or professional class adapted to perform certain system control functions, such as providing a user control interface, that is, a "soft control panel". In this respect, RSC 114 may differ from LSC 112 in being connected to a remote user/controller, for example, for diagnostic purposes, through a Telecommunication Link (TC).

SBIs 116 are the elements, described above, through which indirectly connected elements such as Satellite Processing Units (SPUs) 118 are provided with access to System Bus 104. As illustrated in FIG. 1, SPUs 118 are interconnected with each other and to an associated SBI 116 through an SPU Bus 120. The link between the associated SPU Bus 120, and thus the SPUs 118 connected therefrom, and System Bus 104 is in turn provided through the associated SBI 116. It should be noted that SPUs 118 and SPU Busses 120 may use the same structure and operation as described below with reference to System Bus 104 and SBP Bus 106, that is, may be arranged as local system buses identical to the main system bus. SPUs 118 and SPU Busses 120 may alternately be of any other suitable design for the system operation.

SPUs 118 essentially include all devices or system elements which, for example, due to data rates or functions, do not require direct access to System Bus 104 to perform their functions. Examples of SPUs 118 are input/output devices such as disc drives, displays, printers, telecommunications links, tape streamers and user terminals. SPUs 118 may further includes independent or associated processing units, such as other general purpose computers or specialized processing devices, such as scanners and specialized arithmetic or signal processors.

Figure 1A:
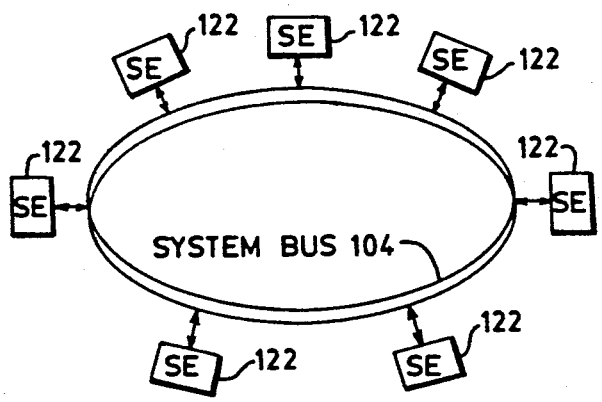
FIGS. 1A and 1B are alternate system bus topologies.
Figure 1B:
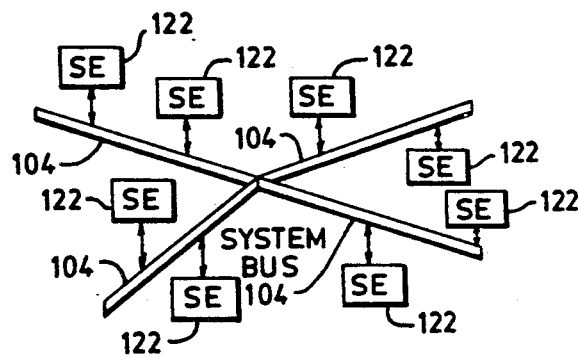

B. System Bus 104, General Structure and Operation (FIGS. 1, 1A and 1B)

Returning to System Bus 104, as described above System Bus 104 is the means through which the elements of System 102 communicate. In the present embodiment of System 102, and as shown in FIG. 1, System Bus 104 is a linear bus with each of the peer elements of System 102 connected therefrom, the connections to System Bus 104 being unidirectional or bidirectional as required by the function of the element. System Bus 104 may be extended as required by the particular configuration of a System 102, that is, to add or subtract system elements or to connect two or more System 102's into a single system.

It should be noted that, as described below, the logical configuration of System Bus 104 is defined by SBP Bus 106 and may assume any topological structure required by the function of System 102. For example, System Bus 104 may be physically arranged in the loop and star configurations illustrated respectively in FIGS. 1A and 1B. In the loop configuration, the ends of System Bus 104 are tied together to form a closed loop from which System Elements (SEs) 122 are connected. In the star configuration, System Bus 104 is comprised of a number of bus segments radiating from a common junction and SEs 122 are connected from the radiating segments as required by the system configuration.

C. System Bus Priority Bus 106 (FIG. 1)

Referring again to FIG. 1, as described in detail further below SBP Bus 106 is the means through which the System 102 elements connected to System Bus 104 determine access to System Bus 104. As shown in FIG. 1, SBP Bus 106 forms a loop with all of the elements connected from System Bus 104 being serially connected in the SBP Bus 106 loop.

It is assumed, in the exemplary System 102 presented herein, that all processing elements connected from System Bus 104 may have the capability to independently initiate interprocessor communications; thus all elements connected from System Bus 104 are shown as connected in the SBP Bus 106 loop. In certain cases, for example, memory elements, the processing elements may be such that they do not initiate interprocessor communications but will only receive and respond to such communications. Such elements will require access to System Bus 104 to receive such communications and to respond to such communications, for example, by reading data from a memory element to a CPU element, but will not be required to claim access to System Bus 104, that is, access to System Bus 104 will be provided by the element sending the communication being responded to. In such cases, these "response only" elements need not be connected in the SBP Bus 106 loop but will be connected to System Bus 104.

As described below, priority of access to System Bus 104 is passed from one element of System 102 to the next element in the SBP Bus 106 loop in a "rotating daisy chain". That is, if a given element currently has access to System Bus 104, the next element along the SBP Bus 106 loop following the current element has the highest priority for next access to System Bus 104, followed by the next element along SBP Bus 106, and so on around the SBP Bus 106 loop until the current element is reached again. When the element currently having access releases System Bus 104, the opportunity to gain next access is passed through SBP Bus 106 to the next element along SBP BUS 106. That next element may take access to System Bus 104 or, if it does not do so, passes the opportunity for access to its next element along SBP Bus 106, and so on until the element originally having access is reached again or some element along SBP Bus 106 takes access to System Bus 104. The order of priority of access to System Bus 104 thereby rotates around SBP Bus 106 with each element in turn having an opportunity to gain access to System Bus 104. Thus the average priorities of access to System Bus 104 of all elements connected thereto will be equal, with the relative priorities of the elements at particular points in time being determined by their positions along SBP Bus 106 relative to the element currently having either actual access to or the right to access System Bus 104.

Because of the rotating shifting of access priority to System Bus 104 among the elements of System 102 connected from SBP Bus 106, the elements connected to System Bus 104 do not contend for access to System Bus 104. As a result, the access determination logic, described further below, is simplified and, by eliminating System Bus 104 overhead which would otherwise be used in resolving access priorities, the speed of communication between the elements connected to System Bus 104 is increased. In addition, and because each element connected to System Bus 106 and SBP Bus 106 has an equal opportunity to gain access to System Bus 104, no element can be locked out of access to System Bus 104 for an extended period.

Moreover, and again because of the rotating shifting of access priority to System Bus 104 among the elements of System 102, the position of a System 102 element along either SBP Bus 106 or System Bus 104 has no bearing on the average priority of that element to access System Bus 104. That is, and as described above, all elements connected to System Bus 104 and in the SBP Bus 106 loop are peers having, on the average, equal access rights to System Bus 104. As such, an element may be added to System 102, or moved from one point along System Bus 104 and SBP Bus 106 to another, without effecting the average relative priorities of access to System Bus 104 of that element or any of the other elements connected to System Bus 104.

In this regard, SBP Bus 106 is represented in FIG. 1 as comprising a simple, clockwise loop with each element of System 102 being connected in series around the loop. It should be noted, however, that this representation is selected only for clarity of presentation. The elements of System 102 connected from System Bus 104 may, in fact, be connected in series along SBP Bus 106 in any desired order.

The order of elements along SBP Bus 106 may be effected, for example, by the above described temporary priorities of access having effect whenever a certain element has access to System Bus 104. That is, whenever a given element has access to System Bus 104, the next element along SBP Bus 106 has highest priority of next access, and so on around the SBP Bus 106 loop. If, for example, it were known that a particular operation involving access to System Bus 104 by a first element were frequently followed by a related operation again involving access to System Bus 104 by a second element, the second element may be connected in SBP Bus 106 next after the first element. Thus, whenever the first element executed its operation, it would be known that the second element would have the highest priority of next accessing System Bus 104.

To illustrate with reference to FIG. 1, assume that SBI1 116 is primarily engaged in input/output operations of information being operated upon by CPU1 110, for example, text processing. In such a case, and in order to enhance speed of response to user operations, it may be desirable to allow CPU1 110 next access to System Bus 104 each time SBI1 116 transfers information from a user, that is, a SPU 118, to one of MEM1-n 108. In this case, then, CPU1 110 could be connected in the SBP Bus 106 loop next after SBI1 116.

Finally, a second element of SBP Bus 106 is illustrated in FIG. 1 and referred to as Local Priority Link (LPL) 124. LPL 124 is essentially a means by which the relative priorities of elements interconnected through LPL 124 may be fixed, as opposed to the rotating priorities determined by SBP Bus 106. As will be described in detail in a following description of the SBP Bus 106 element residing in each element connected therefrom, LPL 124 allows the fact of a pending requirement for access to System Bus 104 by one element to be passed to another element connected along a LPL 124 to inhibit any pending accesses to System Bus 104 in the second element.

D. System 102 Bus Structure (FIG. 2)

Figure 2:
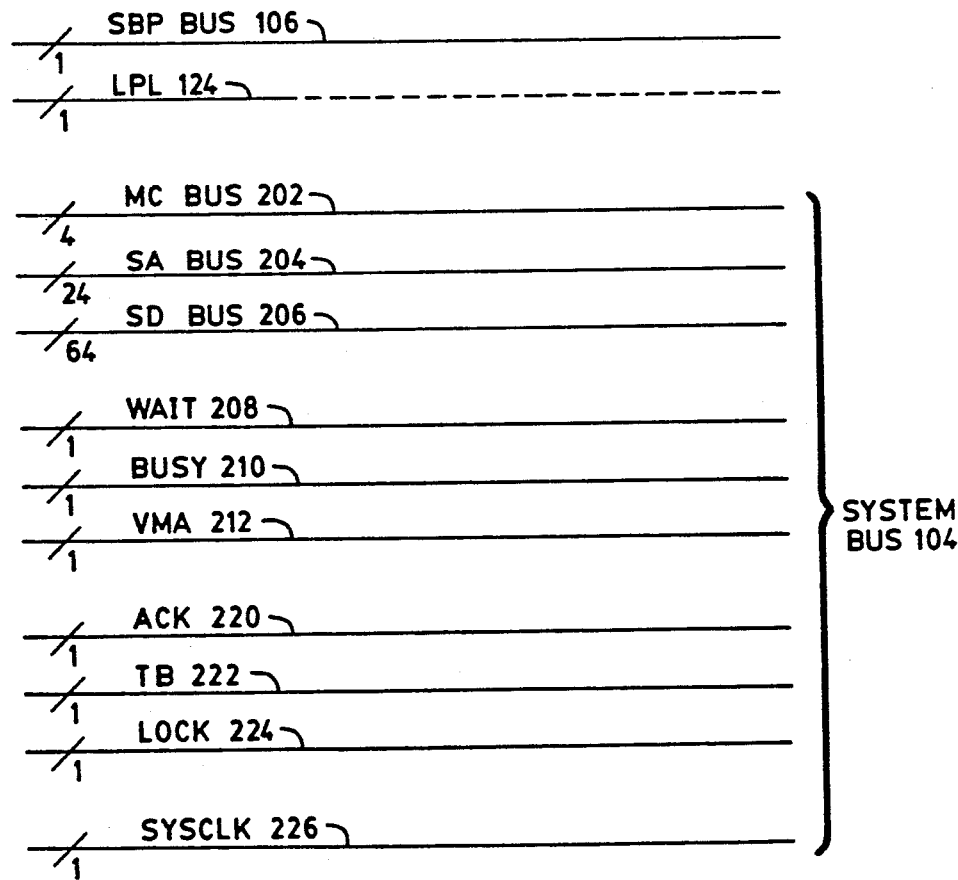
FIG. 2 is a diagram of the bus structure of the present invention.

Referring to FIG. 2, therein is presented a diagrammic representation of System 102's bus structure. As described above and shown in FIG. 1, this structure includes System Bus 104, SBP Bus 106 and, in certain cases, an associated LPL 124.

D.1 Memory Control Bus 202: Memory Operations and Interprocessor Communications As shown in FIG. 2, System Bus 104 includes a plurality of multiple and single line sub-busses. The first of these sub-busses is Memory Control (MC) Bus 202 which, upon the occurrence of a System 102 element obtaining access of System Bus 104, is used to communicate the type of System Bus 104 operation to be performed.

That is, when an element takes control of System Bus 104 that element signals this access by driving SBP Bus 106 to a state indicative of this fact and places on MC Bus 202 a code indicating the type of System Bus 104 operation to be performed. The elements of System 102 connected to System Bus 104 detect the occurrence of a System Bus 104 access by monitoring the state of SBP Bus 106 and, when an access is indicated, determine the type of System Bus 104 operation to be performed by reading the code placed on MC Bus 202 by the element having access to System Bus 104.

Most System Bus 104 operations are memory related, that is, are reads from or writes to MEMs 108. As such, and as will be seen below with reference to the MC Bus 202 codes, the entire class of non-memory related operations are indicated by a single code indicating that an "interprocessor" communication is to be executed, that is, a communication between two non-memory elements, such as an SBI 116 band and a CPU 110. As described below, the elements connected to System Bus 104 must in such cases refer to other of the System Bus 104 sub-busses to determine and execute interprocessor communications.

The MC Bus 202 codes provided in the present implementation of System 102 include:

| CODE | TYPE OF OPERATION |
|---|---|
| 0 | No operation; |
| 3 | Read the contents of an MM 108 control register; |
| 4 | Read a quad word (16 bytes) of information from a specified MM 108 address location; |
| 5 | Read an octal word (32 bytes) of information from a specified MM 108 address location; |
| 6 | Read a double word (8 bytes) of information from a specified MM 108 address location; |
| 7 | Read a word (4 bytes) of information from a specified MM 108 address location; |
| 8 | Perform an inter-processor communication; |
| B | Write to an MM 108 control register; |
| C | Write a byte into a specified MM 108 address location; |
| D | Write a half word (2 bytes) into a specified MM 108 address location; |
| E | Write a double word into a specified MM 108 address location; and, |
| F | Write a word into a specified MM 108 address location. |

It should be noted that the above codes are presented in hexidecimal form and that codes 1, 2, 9 and A are reserved for future use.

Interprocessor communications are thereby executed as a default case from memory related operations. That is, a short "decision branch", reference to a code on MC Bus 202, is provided to identify and initiate memory related operations while a longer "decision branch", reference to further information on other sub-busses of System Bus 104 is required for non-memory related operations. This method thereby effectively increases the speed with which the majority of System Bus 104 operations, that is, memory related operations, may be initiated and executed by providing a shorter decision path for such operations while retaining flexibility in defining and executing all types of System Bus 104 operations.

D.2 System Address (SA) Bus 204 and System Data (SD) Bus 206

The next major sub-busses of System Bus 104 are System Address (SA) Bus 204 and System Data (SD) Bus 206. Considering first memory related operations, SA Bus 204 is the means by which read and write addresses are communicated between elements requesting memory operations and the MEMs 108 executing the operations while SD Bus 206 is the means by which information is communicated between the MEMs 108 and the other elements of System 102.

D.2.a Memory Operations

In a memory operation, as described above the System 102 requesting a memory operation first gains access to System Bus 104 through the operation of SBP Bus 106, described in further detail below, and places an appropriate MC Bus 202 code on MC Bus 202 to indicate the type of operation to be performed. The requesting element then places the read or write address onto SA Bus 204 and, if the operation is a write, places the data to be written onto SD Bus 206. The addressed MEM 108 then writes the data into the corresponding storage location therein. If the operation is a read, the addressed MEM 108 reads the information from the addressed storage location and places the information on SD Bus 206, from which the information is read by the requesting element. In the present implementation of System 102, for example, SA Bus is 24 bits wide, expandable to 31 bits, while SD Bus 206 is 64 bits, or a double word, wide.

Associated with SA Bus 204 and SD Bus 206 are three further single line sub-busses whose primary functions relate to memory operations. The first of these is WAIT 208. This signal is asserted by an addressed MEM 108 during a memory read operation if the requested information is not available and is monitored by the requesting element, which may accordingly go into a wait mode until the information becomes available.

The second memory operation control is BUSY 210, which is asserted by an addressed MEM 108 during a memory operation and before a System Bus 104 transmission is initiated. BUS 210 indicates that System Bus 104 is not available and is monitored by the elements of System 102.

The third memory operation control is Valid Memory Access (VMA) 212, which is asserted by an addressed MEM 108 to indicate that a requested memory operation is valid, that is, that the address or data are valid. VMA is monitored by the element requesting the memory operation to determine whether the request was successful, that is, valid.

Figure 2A:
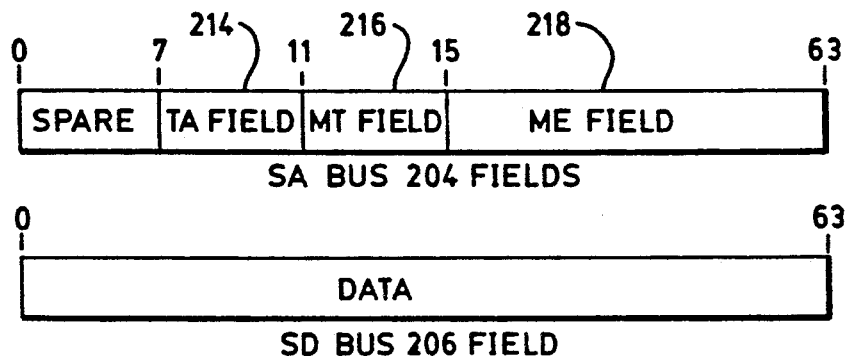
FIG. 2A is a diagrammic representation of interprocessor communications transmitted through the bus structure of the present invention.

D.2.b Interprocessor Communications (FIG. 2A)

Now considering non-memory related operations, that is, interprocessor communications, SA Bus 206 and SD Bus 206 operate differently in certain respects from that described above when an interprocessor operation is to be performed. As described above interprocessor operations are treated as a default from memory related operations. That is, a single MC Bus 202 code indicates the entire class of non-memory type operations. As also described above, upon the appearance of the interprocessor communication code on MC Bus 202 the elements connected to System Bus 104 must refer to information presented on SA Bus 204 and SD Bus 206 by the requesting element to determine the type of interprocessor operation to be executed.

Referring to FIG. 2A, therein is represented the information which may be presented upon SA Bus 204 and SD Bus 206 in an interprocessor operation. As shown therein, the information appearing on SA Bus 204 includes a 4 bit Target Address (TA) Field 214 identifying the target, or intended recipient of the message, a 4 bit Message Type (MT) Field 216 identifying the type of message to be sent to the target, and a 16 bit Message (ME) Field 218 which may contain a message. In certain interprocessor communication operations, wherein data is to be transmitted from one element to another, SD Bus 206 may contain a data field of up to 8 bytes.

D.2.b.1 TA Field 214 Codes

Considering now the various interprocessor communication fields appearing on SA Bus 204, the TA Field 214 may, for example, contain the following target identification codes:

| CODE | TARGET IDENTIFIED |
|---|---|
| 0 | Support Control Unit (e.g., LSC 112 or RSC 114); |
| 1 | Broadcast to all CPUs 110; |
| 2 | CPU1 110; |
| 3 | CPU2 110; |
| 4 | CPU3 110; |
| 5 | CPU4 110; |

| CODE | TARGET IDENTIFIED |
|---|---|
| 6 | CPU5 110; |
| 7 | CPU6 110; |
| 8 | CPU7 110; |
| 9 | CPU8 110; |
| A | Reserved for future use; |
| B | SBI1 116; |
| C | SBI2 116; |
| D | SBI3 116; |
| E | SBI4 116; and |
| F | Broadcast to all SBIs 116. |

It should be noted that the above codes are presented in hexidecimal format.

It is apparent from the above code formats that the exemplary system envisioned in the above code assignments includes a single Support Control Unit 112 or 114, up to 8 CPUs 110 and up to −4 SBIs 116. The assignment of target codes may be altered at will, depending upon the envisioned configuration of the particular System 102.

It should be noted that SPUs 118 are targeted and messages transmitted thereto through the SPU 118's associated SBIs 116. It should also be noted that the interprocessor communications allow the simultaneous broadcast of messages to all elements of a given type, for example, to all CPUs 110 or to all SBIs 116.

There are no target identification codes for memory elements, that is, for MEMs 108, provided in the exemplary TA Field 214 codes. As described previously, all memory related operations are initiated at the MC Bus 202 code level and the target MEMs 108 identified by addresses concurrently appearing on SA Bus 204.

D.2.b.2 MT Field 216 Codes

The contents of the MT Fields 216 depend upon the particular type of recipient identified in the associated TA Field 214, that is, in the present example, whether the targeted recipient is an SBI 116, that is, an SPU 118 connected from an SBI 116, a CPU 110 or Support Control Unit 112 or 114. As will appear in the exemplary MT Field 216 codes presented below, an MT Field 216 code may identify a message as being the transfer of a message, the transfer of data, or a command for an operation or change of operating state on the part of the recipient element.

Considering first examples of the types of MT codes which may be transmitted to an SBI 116 type of element:

| CODE | MESSAGE TYPE |
|---|---|
| 0 | Message transfer to target SPU 118; |
| 1 | Data transfer to target SPU 118; |
| 8 | Reset target SBI 116; |
| 9 | Reset target SPU 118; |
| A | Turn Input/Output I/O)) protection off; |
| B | Turn I/O protection on; |
| C | Enable I/O access to specified memory page; and |
| D | Disable I/O access to specified memory page. |

Again, the MT Field 216 codes above are presented in hexidecimal format and codes, 2, 3, 4, 5, 6, 7, E and F are reserved for future use.

Considering now examples of the MT field 216 codes which may be used when the targeted recipient is a CPU 110:

| CODE | MESSAGE TYPE |
|---|---|
| 0 | Class 1 I/O Interrupt; |
| 1 | Class 2 I/O Interrupt; |
| 8 | Interprocessor communications; and, |
| 9 | Synchronize clock. |

Again, the codes are presented in hexidecimal format and codes 2 to 7 and A to F have been reserved for future use.

It should be noted that the above CPU 110 message types provide for two classes of I/O interrupt, Class 1 for when no error has appeared in the I/O operation and Class 2 for when an error has occurred in the I/O operation, for example, in the data. The two classes are provided because of the different handling of these events by the targeted CPU 110.

In the Interprocessor communication type of message, MT Code 8, only SA Bus 204 is used for the communication and the recipient CPU 110 refers to the accompanying ME Field 218 appearing on SA Bus 204 to determine the message, examples of which are presented below. The occurrence of such a communication causes an interrupt pending flag to be set in an interprocessor communication register internal to the recipient CPU 110, described below. The recipient CPU 110 micromachine will then read the interrupt pending flag, execute a macrointerrupt at the next opportunity, and execute a routine to appropriately handle the received message. If the interprocessor communication interrupt flag in the recipient CPU 110 is already active, the recipient CPU 110 will send to the transmitting CPU 110 acknowledgement and busy signals, as described below. It should be noted that in communications from SBIs 116 to CPU's 110, the SBI 116 receiving a busy response will handle the busy response in a manner appropriate to the SBI 116's bus protocol, that is, its protocol with respect to its SPUs 118.

Again, the particular message type codes appearing in MT Field 216 and their meanings may be determined at will, depending upon the configuration and function of the System 102 envisioned and the elements appearing therein.

D.2.b.3 ME Field 218 Messages

The 2 byte interprocessor communicating messages appearing in ME Field 218 are, again, dependent upon the function and configuration of System 102 and the elements comprising System 102. Examples of such messages include, in the present implementation, communications between the system elements and the System 102's operating system being executed in the CPUs 110. Such operating system communications may include communications between an I/O device, that is, an SBI 116 or SPU 118, and the operating system and communications between the operating system and a Support Control Unit 112 or 114. For example, the operating system may send a message to a Support Control Unit to read or update an error file or requesting the Support Control Unit to examine some aspect of System 102's operation and report the findings of the examination to the operating system, for example, in diagnostic operations.

Other examples include communications between the CPUs 110 of a multiple-processor configuration of System 102. For example, a particular CPU 110 may wish exclusive access to a given page of memory and may inquire of the other CPUs 110 whether they are using that memory page. The requesting CPU 110 may then, if that page is not being used by another CPU 110, inform all CPUs 110, by a broadcast communication, that it is claiming exclusive access to that memory page. In a further example, a CPU 110 may wish to open and modify a particular file and will inform all other CPUs 110 that it is obtaining exclusive access to that file for that purpose. Yet other examples are messages coordinating the activities of the CPUs 110; for example, a first CPU 110 may assign a task to a second CPU 110 by an interprocessor message and the second CPU 110 may send a communication informing the first CPU 110 when the task is completed.

Still other examples of interprocessor messages occupying the ME Field 218 are I/O messages, essentially commands from the CPUs 110 to the SBIs 116 or SPUs 118 to initiate or control the operations of these elements.

Finally, and referring again to FIG. 2, as described above with reference to memory related operations certain single line sub-busses of System Bus 104 are associated with interprocessor communication operations. Among these are Acknowledge (ACK) 220 and Target Busy (TB) 222. ACK 220 is asserted by the target element of an interprocessor communication when that target exists and acknowledges that the sending element is attempting to send an interprocessor communication to that target element. The sending element monitors ACK 220 to determine whether the attempt to send an interprocessor communication was successful.

TB 222 is asserted by the target element of an interprocessor communication to indicate that the target element is busy and cannot accept the interprocessor communication. The sending element monitors TB 222 and, if the TB 222 is asserted by the target element, will handle the condition depending upon the nature and function of the sending element.

Also associated with both interprocessor communications and memory related operations is LOCK 224. LOCK 224 may be asserted by the initiator of a memory related operation or interprocessor communication to lock out all other users of System Bus 104. LOCK 224 may be asserted, for example, when an element wishes to communicate a series of interprocessor communications or a series of memory operations. LOCK 224 is monitored by all elements connected to System Bus 104 and no user will attempt to obtain access to System Bus 104 while another element is asserting LOCK 224.

Finally, as indicated in FIG. 2, System Bus 104 may include a System Clock (SYSCLK) 226, which is provided to all users of System Bus 104, thereby achieving common timing for all such elements.

Having described the operation of the bus structure of System 102, the bus interface logic residing in each of the elements connected to System Bus 104, and their operation, will be described next below.

E. System Bus Interfaces (FIGS. 3A and 3B)

Figure 3A:
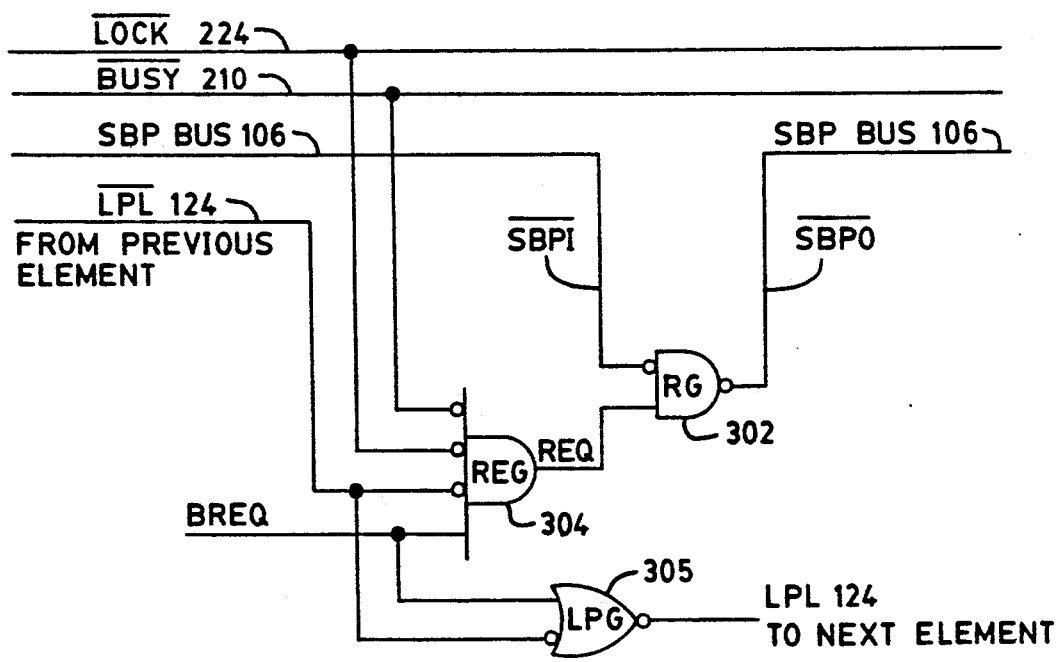
FIGS. 3A and 3B are schematic representations of the system bus interfaces incorporated into the elements of the present system.
Figure 3B:
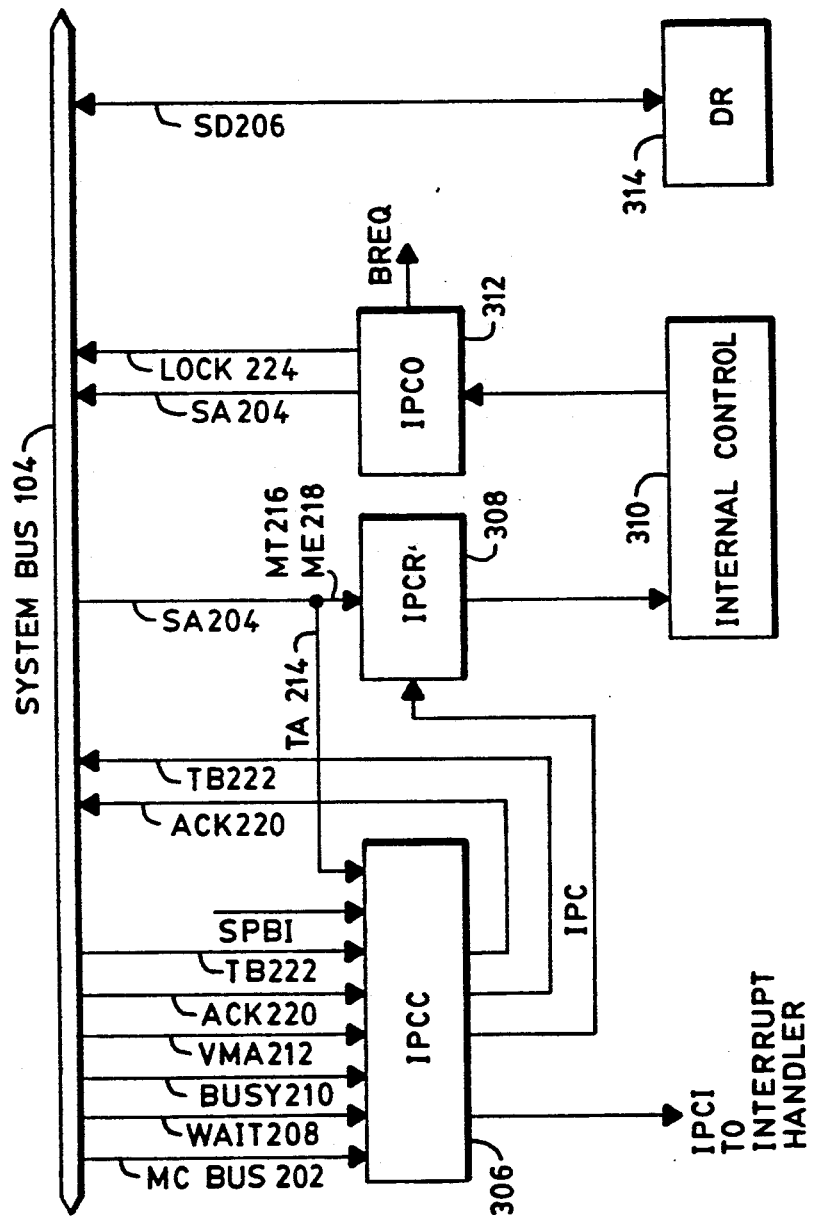

Referring to FIGS. 3A and 3B, therein are presented diagrammic representations of the interface circuitry provided in each element connected to System Bus 104 to interface these elements to System Bus 104. It should be noted that the logic and circuitry presented herein are illustrative and representative only and may be replaced by any logic or circuitry performing equivalent functions. In addition, where the design and operation of the logic and circuitry presented herein will be well understood by one of ordinary skill in the art, that logic or circuitry will not be described in detail. The operation of the element interfaces will, however, be described in detail where relevant to the present invention.

E.1. SBP Bus 106 Interface (FIG. 3A)

Referring first to FIG. 3A, therein is presented the interface circuitry primarily concerned with requesting and gaining access to System Bus 104. As previously described, each element connected to System Bus 104 is connected in series along the SBP Bus 106 loop. Other sub-busses of System Bus 104 concerned in obtaining access to System Bus 104 are, as indicated in FIG. 3A, Busy 210 and LOCK 224 and, in certain cases, LPL 124.

As previously described, when an element currently having access to System Bus 104 releases System Bus 104, the opportunity to gain next access to passed through SBP Bus 106 to the next element along SBP Bus 106. That next element may take access to System Bus 104 or, if it does not do so, passes the opportunity for access to its next element along SBP Bus 106, and so on until the element originally having access is reached again or some element along SBP Bus 106 takes access to System Bus 104.

As shown in FIG. 3A, the input of SBP Bus 106 from the previous element along the SBP Bus 106 loop is designated as SBP Input (SBPI) and is connected to a first input of Request Gate (RG) 302. It should be noted that SBPI is shown as an active low signal, as are all other overlined signals. The output of RG 302 is connected to the continuation of the SBP Bus 106 loop to the next element along the SBP Bus 106 loop and is designated as SBP Output (SBPO).

A second input of RG 302 is connected from the Request (REQ) output of Request Enable Gate (REG) 304. REQ will be generated, as described below, when the associated element wishes to request access to System Bus 104 and other conditions, determined by the various inputs to REG 304, also described below, do not prevent the element from requesting access. REQ operates as an enabling signal with respect to RG 302 and SBPI, that is, SBPI will be passed through RG 320 as SBPO and thus the SBPI of the next element along the SBP Bus 106 loop if REQ is not asserted. If, of course, REQ is asserted, SBPI is prevented from passing through RG 302 to become SBPO and the next element along the SBP Bus 106 loop will not receive an SBPI, the present element having claimed access to System Bus 104. RG 302 thereby operates as a gate to prevent the propagation of the opportunity to obtain access to System Bus 104, that is, the element may "capture" the opportunity, and as a signal level restorer for the SBPI/SBPO signal propagated along the SBP Bus 106 loop.

It should be noted that due to the structure of the SBP Bus 106 interface logic, the SBP Bus 106 access signal will propagate around the SBP Bus 106 loop at a speed determined by the propagation time around the physical loop and the delays through the RGs 302 of the elements connected therefrom. As such, delays in gaining System Bus 104 access due to the operation of SBP Bus 106 and the element interfaces thereto are minimized and the overall speed of operation of System 102's bus structure enhanced.

Referring now to REG 304, as shown in FIG. 3A REG 304 receives a Bus Request (BREQ) signal from the element's internal control circuitry, described further below, when the element wishes access to System Bus 104. BREQ is gated, in REG 304 by inputs BUSY and LOCK, previously described, from respectively BUSY 210 and LOCK 224. In certain cases, also previously described, REG 304 is provided with a Local Priority signal from a previous element through an LPL 124. The enabling of REQ, and thus the capture of SBPI/SBPO thereby requires that BUSY, LOCK and a Local Priority signal, if any, not be asserted.

E.2 System Bus 104 Interface (FIG. 3B)

Referring to FIG. 3B, therein is presented a diagrammic representation of the general interface of System Bus 104 of an element connected to System Bus 104. As shown therein, the interface logic includes an Interprocessor Communication Control (IPCC) 306 having inputs connected from the sub-busses of System Bus 104 as indicated. Included among these inputs are the 4 bits of MC Bus 202, WAIT, BUSY, VMA, ACK AND TB, the functions of which have been described above. Also included in IPCC 306's inputs are the TA Field 214 from SA Bus 204.

These inputs essentially define the occurrence, type and state of execution of interprocessor communications and IPCC 306 is essentially comprised of decoding logic for decoding these inputs and providing corresponding outputs to the internal control circuitry of the element, for example, microcode control circuitry.

The design of such internal control circuitry and of such decoding logic as IPCC 306 is well understood by those of ordinary skill in the art, especially after the previous and following descriptions of the operation of System 102's bus structure.

Among the outputs provided by IPCC 306 are an Interprocessor Interrupt (IPCI) to the elements interrupt handler, as previously described, and ACK and TB signals to ACK Bus 220 and TB Bus 222.

IPCC 306 also provides an output indicating the occurrence of an interprocessor communication (IPC) to Interprocessor Communication Register (IPCR) 308 which, as shown in FIG. 3B, is a register connected from the MT Field 216 and ME Field 218 portions of SA Bus 204. IPCR 308 thereby captures and stores the MT and ME fields of an interprocessor communication appearing on SA BUs 204, and provides these fields as inputs to the elements Internal Control Logic (Internal Control) 310.

As is well known in the art, Internal Control 310 may be comprised, for example, of dedicated control logic or a microcode programmed microprocessor controller. Internal Control 310 operates in a first respect to control the operation of the element in response to a received interprocessor communication and, in a second respect, to initiate and control interprocessor communications from the present element.

In this second respect, Internal Controller 310 may generate interprocessor communication control signals to Interprocessor Communication Output Controller (IPCO) 312. IPCO 312 may in turn be comprised of registers and decoding logic to generate MT and ME fields to the SA Bus 204 when the element is initiating an interprocessor communication, and may generate the BREQ signal, described above, when the element wishes to request access to System Bus 104 for an interprocessor communication.

Finally, the interface circuitry may include Data Registers and Drivers (DR) 314 connected with SD Bus 206 to communicate data between the element and SD Bus 206. Such data communication may occur, as previously described, in a memory related operation or when data is transferred in an interprocessor communication.

The interface between an element and System Bus 104 may differ from that described above when that element is a memory element such as an MEM 108. In such a case, the circuitry illustrated in FIG. 3A may be modified accordingly, that is, may contain only those functions necessary for memory related operations.

For example, an MEM 108 IPCC 306 may be provided only with inputs from MC Bus 202, which are sufficient and complete to define all memory related operations. The MEM 108's IPCC 306 may, accordingly, provide outputs WAIT, BUSY and VMA to the appropriate System Bus 104 sub-busses, rather than those shown in FIG. 3A. Similarly, the IPCR 308 of an MEM 108 will be comprised of an address input register connected from SA Bus 204 for receiving memory read and write addresses, and the MM108 will include a bidirectional data connection to SD Bus 206.

Having described the bus and interface structures of System 102's bus structure, and the functions and operation of the signals involved therein, the operation of System 102's bus structure will be described further below with reference to flow charts illustrating these operations.

F. Flow Chart Illustration of Operation (FIGS. 4A and 4B)

Figure 4A:
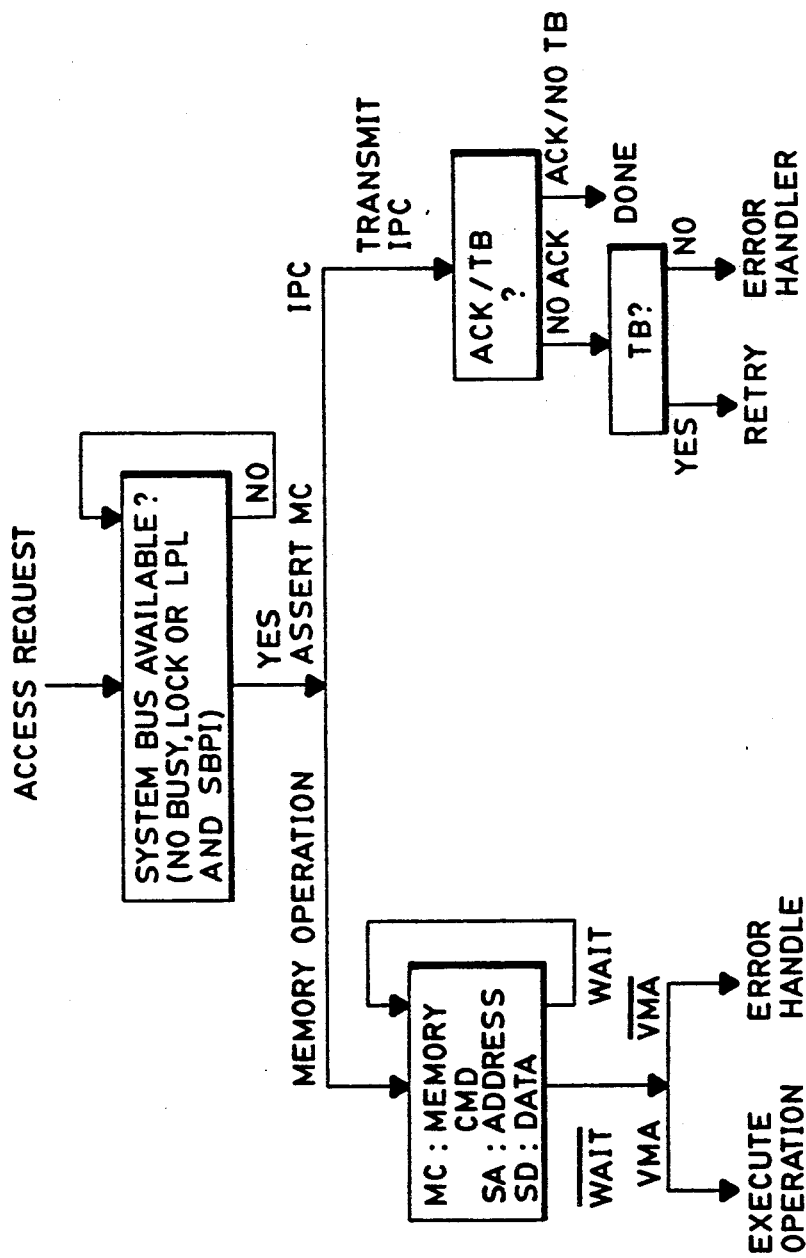
FIGS. 4A and 4B are flow charts illustrating the operation of the present invention.
Figure 4B:
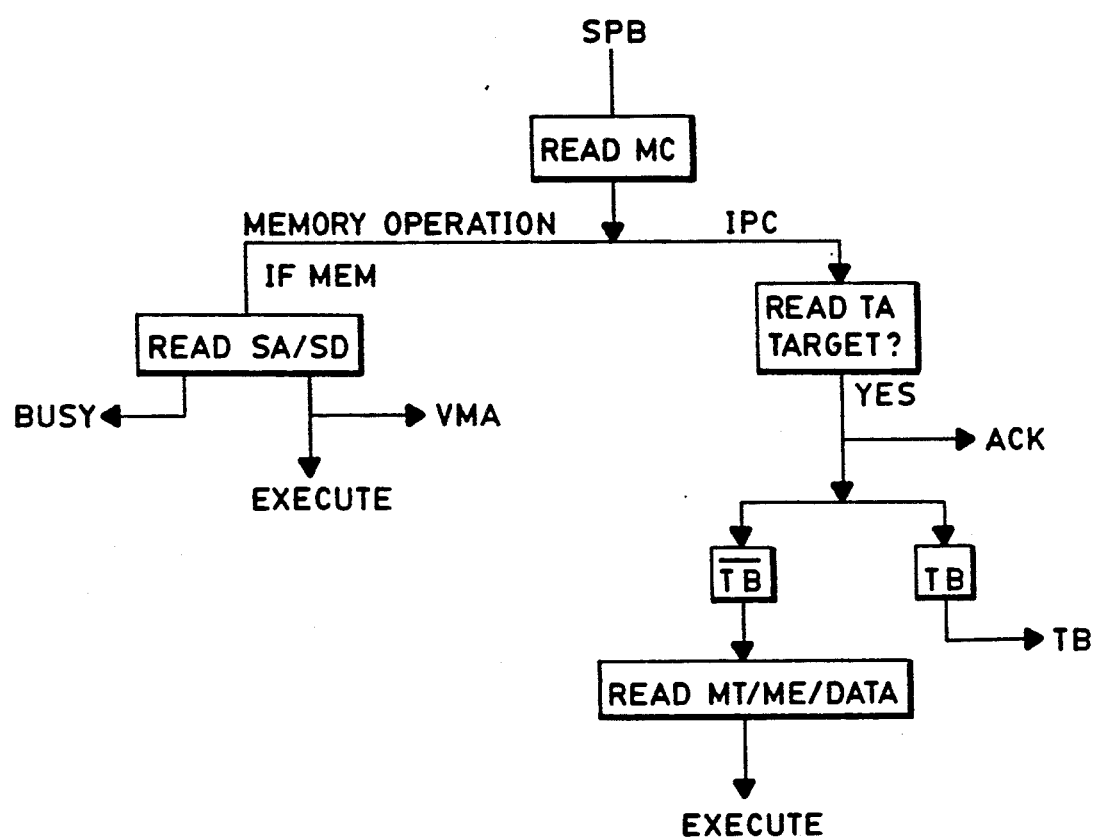
Figure 5:
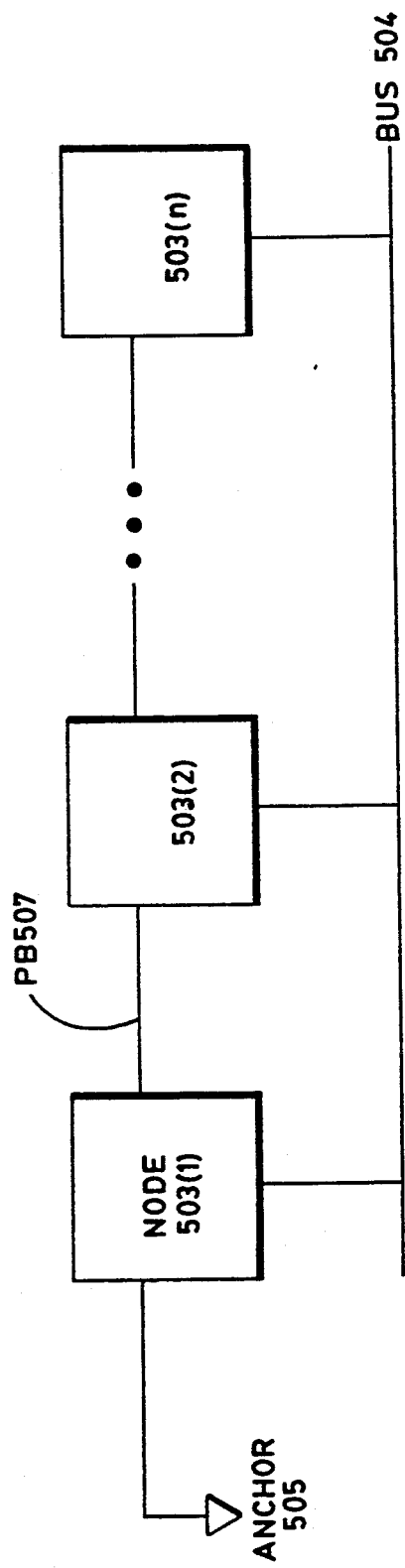
FIG. 5 is a block diagram of a prior-art static daisy chain.

Referring to FIGS. 4A and 4B, therein are presented flow chart illustrations of the operations of System 102's bus structure. FIG. 4A is an illustration of a system bus operation from the viewpoint of the bus requestor, while FIG. 4B is an illustration from the viewpoint of the target element.

F.1 Bus Requestor Operation (FIG. 4A)

Referring to FIG. 4A, an interprocessor bus operation, either a memory operation or an interprocessor communication, is begun with the requesting element generating, through its internal control logic, an Access Request. In the first step, the requestor determines whether System Bus 104 is available; that is, and as previously described, the requestor determines whether BUSY, LOCK and LPL 124, if any, are asserted and whether an SBPI is available.

In the second step, and if the conditions for bus availability are met, the requestor seizes System Bus 104 by capturing the SBP Bus 106 signal and places an appropriate code on MC Bus 202 to indicate the type of operation to be performed. If System Bus 104 is not available, the requestor takes what action is necessary to wait until the bus is available and retries access.

If access to System Bus 104 was gained, and the operation is a memory related operation, the requestor places the memory operation address on SA Bus 204 and the information to be written, if any on SD Bus 206 and monitors WAIT Bus 208.

If the responding memory element is busy, the memory will assert WAIT on WAIT Bus 208 and the requesting element must enter a wait mode until the responding memory element is available.

If the responding memory element is available, and the memory request is valid, the memory element will assert VMA on VMA Bus 212 and the operation will be completed. If the memory request was not valid, vMA will not be asserted and the requestor must refer to its error handler facility to resolve the problem.

If the requested operation was an interprocessor communication, the requesting element will place the appropriate fields, as previously described, on SA Bus 204 and SD Bus 206 and will monitor ACK Bus 220 and TB Bus 222

If the target element asserts ACK and does not assert TB, the operation will be completed.

If the target element asserts ACK and TB, the requestor must wait and retry the communication as the target element is busy.

If the target element does not assert and does assert TB then the target element is again identified as busy and the requestor must retry the communication. If the target element does not assert ACK or TB, then the requestor must refer to an error handler to resolve the problem.

F.2 Target Element Operation (FIG. 4B)

Referring now to FIG. 4B, therein is presented a general flow chart of the operation of a target element for both memory related operations and interprocessor communication operations.

At the first step, the target element monitors SBP Bus 106 and identifies the initiation of a System Bus 104 operation by the state of SBP Bus 106. At this time, the element reads the code on MC Bus 202 to determine the type of System Bus 104 operation to be executed.

Considering first a memory operation, and assuming that the target element is a memory element, the element then reads SA Bus 204 to determine the target address in System 102's address space and SD Bus 206 to capture the data to be written if the operation is a memory write.

If the target element is busy, it will respond by asserting BUSY on BUSY Bus 210. If the target element is not busy and the memory request is valid, the target element will assert VMA on VMA Bus 212 and will perform the requested operation.

Considering finally an interprocessor communication, the target element determines, by reading the MC Bus 202 code, that an interprocessor communication is to be performed and then reads the TA Field 214 from SA Bus 204 to determine whether that element is the target element.

If that element is the target element, it asserts ACK and, if not busy, does not assert BUSY.

Assuming that the element is not busy and is the target element, the element reads the MT Field 216 from SA Bus 204 to determine the type of communication and the ME Field 218 from SA Bus 204 to capture the message. The element then responds to these fields by executing what operations are required by the message, including reading data from the SD Bus 206 if the communication requires the transfer of data.

Figure 6:
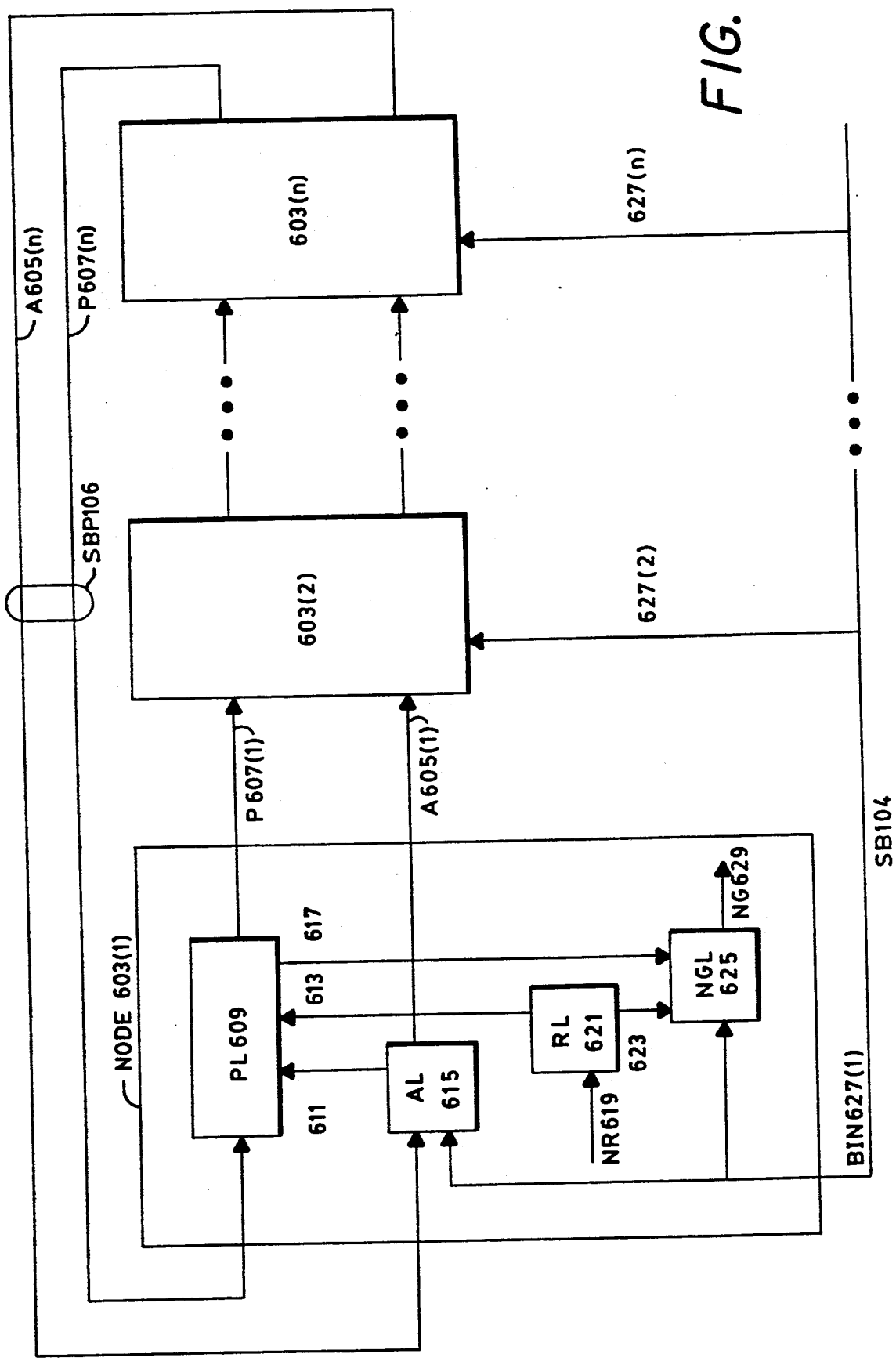
FIG. 6 is a block diagram of the rotating circular chain of the present invention.
Figure 7:
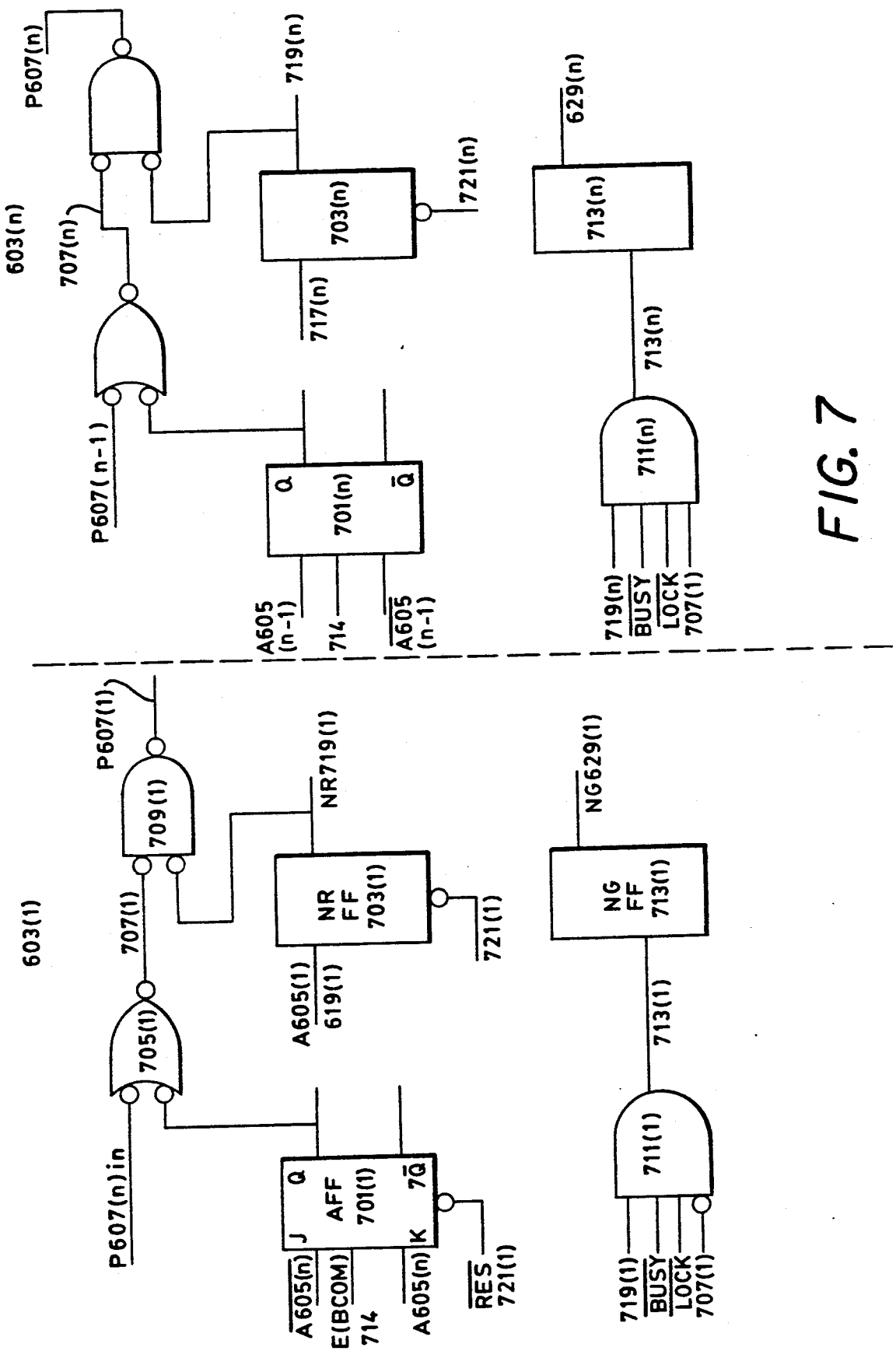
FIG. 7 is a logic diagram of an implementation of the present invention in a node.

ADDITIONAL DESCRIPTION OF SPB BUS 106 AND RELATED PRIORITY LOGIC: FIGS. 6 and 7

As described in the foregoing and shown in FIG. 1, system priority bus (SPB) 106 connects the components of system 102 into a circular daisy chain. As further described in the foregoing, the relative priorities of the components of system 102 are not static, but are instead determined relative to a given component of system 102. During operation of system 102, the component of system 102 from which priority is determined rotates around the circular chain defined by SBP Bus 106. The following additional description provides details of a presently-preferred embodiment of SPB Bus 106 and of the priority logic. The additional description begins with an overview of the priority system and then describes the manner in which the priority system is implemented in the preferred embodiment.

G. Overview of a Preferred Embodiment of the Priority System: FIG. 6

FIG. 6 presents an overview of a presently-preferred embodiment of the priority system employed in system 102. In FIG. 6, the components of system 102 are represented by nodes 603. Each node 603 contains the priority logic by means of which one or more of the components of system 102 gains access to system bus (SB) 104. The number of nodes 603, and the number of system 102 components represented by a given node 603 depend of course on the configuration of system 102. When a node 603 serves more than one component of system 102, the relative priorities among the components served by the node are determined by additional priority logic, for example a static daisy chain 501 connecting the components served by node 603. In such a situation, the priority determined by the additional priority logic determines which of the devices served by node 603 actually receives access to SB 104 when node 603 gains access to SB 104.

Each node 603 is connected to SB 104 and receives at least BUSY 210, LOCK 224, and signals from MC bus 202. Each node 603 is further connected to SBP 106 to form a circular chain, represented in FIG. 6 as including nodes 603(1) through 603(n). In a preferred embodiment, SBP 106 has two components: priority line (P) 607, from which each node 603 determines whether it may access SB 104, and anchor line (A) 605, which permits the node 603 which has the current highest priority and which consequently currently serves as the "anchor" from which the priorities of the other nodes 603 are determined to rotate sequentially around the circular chain. As may be seen from FIG. 6, each node 603 receives A 605 and P 607 from the node 603 immediately preceding it in the circular chain and provides A 605 and P 607 to the immediately following node 603. In the following discussion, A 605 and P 607 carry subscripts indicating the node which is their source. For example, A 605(n) is provided from node 604(n) to node 603(1).

FIG. 6 shows only the internal structure of node 603(1) in detail; however, all other nodes 603 have similar internal structures and operate in similar fashion. There are four main components of the internal structure of node 603(1): priority logic (PL) 609, anchor logic (AL) 615, request logic (RL) 621, and node grant logic (NGL) 625. Beginning with PL 609, that logic receives an input from P 607(n) indicating whether any preceding node 603 has received the right to access the bus, an input 611 from AL 615 indicating whether node 603(1) is presently the "anchor" and therefore has the highest priority, and an input 613 from RL 621 indicating that one of the components represented by node 603(1) wishes to access the bus. PL 609 further produces output P 607(1), which indicates whether following nodes 603 may have the right to access SB 104 and output 617, which indicates whether node 603(1) is presently entitled to access SB 104.

If input 613 does not indicate a request, PL 609 simply passes the input it received from P 607(n) through to P 607(1). If input 613 does indicate a request and input P 607(n) indicates that node 603(1) may have the right to access SB 104, node 603(1) sets output P 607(1) to indicate that following nodes 503 may not have access and output 617 to indicate that node 603(1) is entitled to access SB 104. If input 613 does indicate a request, input P 607(n) indicates that a preceding node 603 has requested access, and input 611 indicates that node 603(1) is not the anchor, PL 609 again passes the value of P 607(n) through to P 607(1) is the anchor, PL 609 sets P 607(1) to indicate that following nodes 603 may not have access and output 617 to indicate that node 603(1) either when no preceding node 603 has requested access to the bus or when node 603(1) is the anchor, regardless of whether a preceding node 603 has requested access.

Continuing with AL 615, AL 615 includes a state element which indicates whether node 603(1) is presently the anchor. At any given time, that state element will indicate that a node 603 is the anchor in only one of the nodes 603 in the circular chain. AL 615 receives as inputs A 605(n), which indicates the value of the state element in the preceding node 603's AL 615 and signals received from SB 104 via BIN 627(1). AL 615 determines from these signals whether any component of system 102 has gained access to SB 104. AL 615 outputs the present value of the state element to PL 609 as described in the discussion of PL 609 and to A 605(1), which provides it to AL 615 of the following node 603. Each time AL 615 receives signals via BIN 627(1) indicating that a component has gained access to SB 104, AL 615 sets the state element to the value presently on A 605(n). AL 615 in all other nodes 603 works in the same fashion; consequently, each time a component gains access to SB 104, the valve of the state element which indicates that a node 603 is the anchor moves to the following node 603. Thus, as components of system 102 use SB 104, the anchor node 603 rotates around the circular chain and each node 603 has the highest priority in turn.

Turning to request logic (RL) 621, RL 621 receives as an input node request (NR) signal 619, indicating that a component represented by node 603(1) is requesting access. As previously indicated, if node 603(1) represents several components, NR 619 may be produced by priority logic (not shown in FIG. 6) which determines which of the components represented by node 603(1) is to gain access to SB 104. RL 621's outputs are 613, which indicates to PL 609 that node 603(1) is making a request to access the bus, and 623, which indicates the same fact to NGL 625. NGL 625 determines whether the component which is requesting access will receive it. Inputs to NGL 625 in a preferred embodiment are BUSY 210 and LOCK 224 from SB 104, output 623 from RL 621 indicating that one of the components represented by node 603(1) is requesting access, and output 617 from PL 609, indicating that node 603(1) is requesting access and output 617 from PL 609, indicating that the node 603(1) is entitled to access. When BUSY 210 and LOCK 224 indicate that SB 104 is available, output 623 indicates that a request has been made, and output 617 indicates that node 603(1) is entitled to access SB 104, NGL 625 output node grant signal (NG) 629 to which the component represented by node 603(1) which has the right to access SB 104 responds by seizing the bus.

The effect of the operations just described is that when a component represented by node 603(1) requests access to SB 104, node 603(1) obtains access either if node 603(1) is the current anchor node or if neither the current anchor node 603 nor any of the nodes 603 following the current anchor node 603 and preceeding node 603(1) is requesting access. Further, each time any component of system 102 obtains access to SB 104, the node 603 following the current anchor node 603 becomes the new anchor node. The former anchor node 603 then has the lowest access priority; however, if the new anchor node 603 and none of the nodes 603 following the new anchor node and preceeding the former anchor node requests the bus, former anchor node 603 may access it. Rotating circular chain 601 thus neither permits a single component of system 102 to "hog" SB 104 nor prevents any component from receiving immediate access to SB 104 when the priority of the component's node 603 permits it.

H. Detailed Description of Node Priority Logic: FIG. 7

FIG. 7 is a logic diagram showing an implementation of PL 609, AL 615, RL 621, and NGL 625 in nodes 603(1) and 603(n). The relationship between FIG. 6 and FIG. 7 is the following: PL 609 is implemented in the nodes of FIG. 7 by means of NOR gate 705 and NAND gate 709; AL 615 is implemented by means of anchor flip-flop (AFF) 701; RL 621 is implemented by means of node request flip-flop (NRFF) 703; and NGL 625 is implemented by means of AND gate 711 and NGFF 713. The discussion will first explain the logic of node 603(1) and then explain the differences between that node and the other nodes 603, exemplified by node 603(n).

Beginning with PL 609, in a preferred embodiment, P 607(n) is high when a preceding node 603 has requested access to the bus and low when no preceding node 603 has requested access. A 605(1), from AFF 701(1), which corresponds to input 611, is low when node 603(1) is the anchor node and otherwise high. NR 719(1), finally, which corresponds to input 613, finally, is high when a component represented by node 603(1) has requested access and otherwise low.

If node 603 is not requesting access, NR 719(1) is low and the value of P 607(1) is determined by the value of input 707(1), which in turn is determined by the value of P 607(n). Thus, when there is no request in node 603(1), the value output on P 607(1) is the same as that received on P 607(n).

If node 603(1) is requesting access, driving NR 719(1) high, and P 607(n) is low, indication that no preceding node has taken access, output 707(1) is low regardless of the value of A 605(1). When 707(1) is low and NR 719 is high, P 607(1) is high, indicating to nodes following node 603(1) that a preceding node has taken access. When P 607(n) is high, P 607(1) is also high, but the value of output 707(1) depends on the value of A 605(1). If it is high, indicating that node 603(1) is not the anchor node, 707(1) is high; if A 605(1) is low, output 707(1) is low. As will be described in more detail with regard to NGL 625, when 707(1) is low and other conditions are met, the component requesting the bus seizes the bus. Thus, the component can seize the bus in either of two cases: if no preceding node 603 has taken access of if a preceding node 603 has, but node 603(1) is currently the anchor node.

As should be apparent from the above discussion, which node 603 in rotating circular chain 601 is to obtain access to SB 604 cannot be determined until each node 603 beginning with the current anchor node has had a chance to respond to P 607. Thus, there must be a period for resolving access which is long enough to permit such response. The length of the period will depend on the gate delays in each node 603 and the number of nodes 603 in the circular chain. It is an advantage of the present implementation that gates 705(1) and 709(1) may be implemented by means of a single AND/OR invert gate. Consequently, only a single gate delay is necessary in each node 603. In system 102, the period for resolving access is 60 ns, and 6 ns are required for set up and gate delay in each node 603; thus system 103 may have up to 10 nodes 603.

Continuing with the implementation of AL 615, AFF 701(1) is a JK flip flop. The J input receives NOT A 605(n), while the K input receives A 605(n). In the AFFs 701 of nodes 603(2) through (n), the J input receives A 605 from the preceding node 603 and the K input receives that node's NOT A 605. When the AFFs 701 receive a rising edge on their clock inputs, the value on the J and K inputs are stored in the flip flops. In the preferred embodiment, the clock signal is F(BCOM) 714. This is a signal which is derived from signals on MC Bus 202 and bus clock signals on SB 104 and which indicates that a component of system 102 has seized the bus. The input of NOT A 605(n) to the J input of AFF 701(1) and of A 605(n) to the K input of that flip flop guarantees that exactly one AFF 701 will have a low Q output, indication that its node 603 is the anchor node, in circular chain 601, and the use of F(BCOM) 714 to set all of the AFFs 701 ensures that the anchor moves to he next node 603 each time a component of system 102 seizes SB 104. At initialization of system 102, an arbitrary one of the nodes 603 in the system is selected to be the first anchor node, and AFF 701 in that node is reset so that A 605 from that node is low. In FIG. 7, node 603(1) is the selected node, and NOT RES 721(1) permits resetting of AFF 701(1).

The implementations of RL 621 and NGL 625 are straightforward. RL 621 consists of NRFF 703, which receives and retains NR signal 619(1) indication that a component represented by node 603(1) has made a request. NOT RES 721(1) permits resetting NRFF 703(1) when the request has been services. NGL logic 625 consists of AND gate 711(1) and NGFF 713(1). AND gate 711(1) requires that NRFF 703(1) indicate a request, that neither BUSY nor LOCK is being asserted in system bus 104, and that output 707(1) indicates that node 603(1) may access the bus, either because no preceding node wants to access it or because node 603(1) is the current anchor node. If all of these conditions hold, NGFF flip flop 713(1) is set, NG 629(1) is high, and in response to that signal, the component which made the request seizes SB 104.

The foregoing discussions has disclosed how one skilled in the art may construct a dynamic circular priority chain in which the priority of a node with regard to access to a bus in a computer system is determined by its position on the circle relative to a current anchor node and in which the current anchor node changes each time a component attached to the bus accesses the bus. In such a dynamic circular priority chain, no node can "hog" the bus, and at the same time, any node can have immediate access to the bus if there is no node with higher priority requesting access. Moreover, the time to determine which node will receive access is no more than that required for a priority signal to propagate through priority logic implemented by means of single gate in each node.

Figure 8:
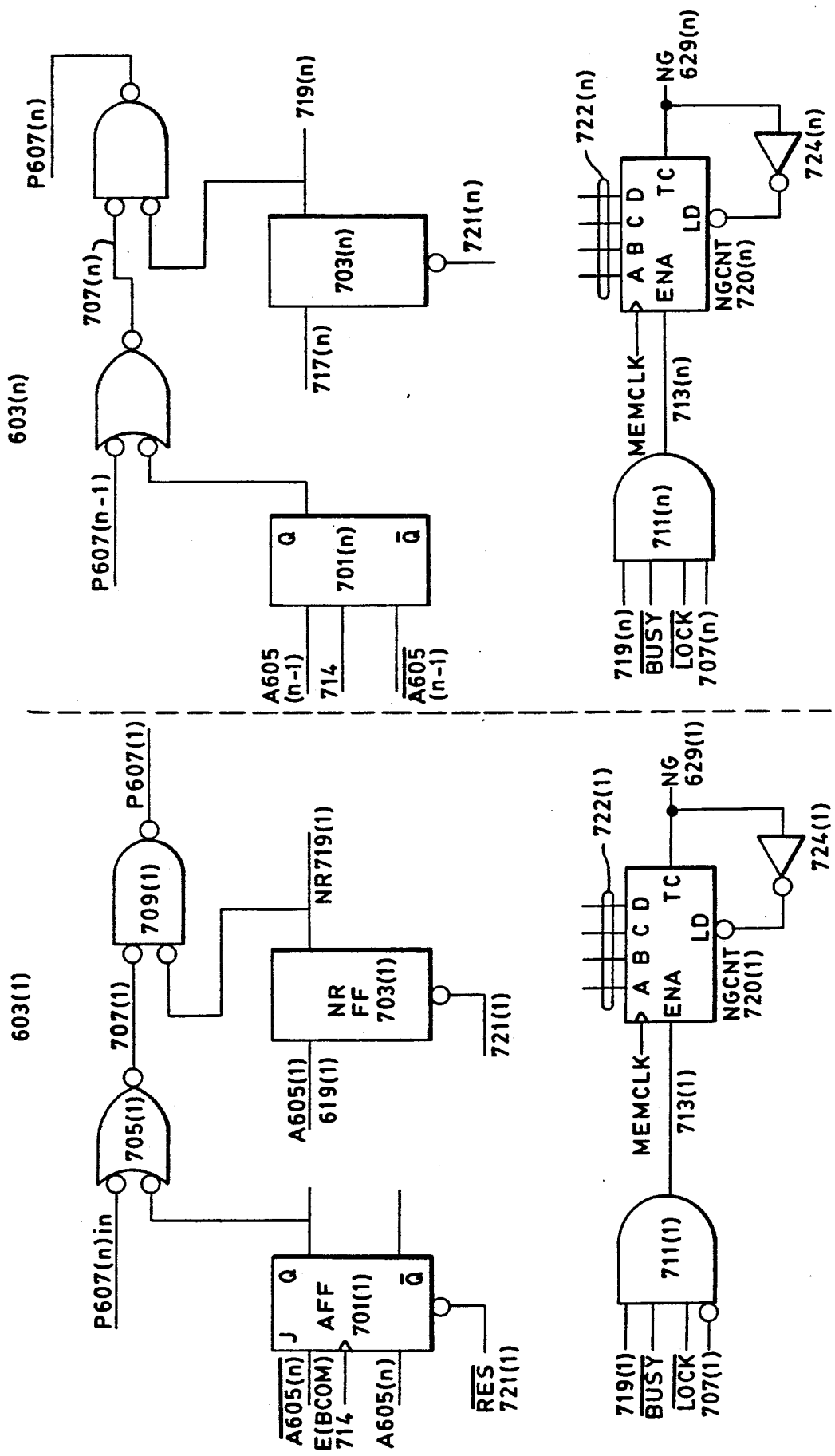
FIG. 8 is a logic diagram of a presently preferred embodiment of the invention.

I. Detailed Description of a Presently Preferred Embodiment of Node Priority Logic: FIG. 8

FIG. 8 is a logic diagram showing an implementation of PL 609, AL 615, RL 621, and NGL 625 in nodes 603(1) and 603(n). The relationship between FIG. 6 and FIG. 8 is the following: PL 609 is implemented in the nodes of FIG. 8 by means of NOR gate 705 and NAND gate 709; AL 615 is implemented by means of anchor flip-flop (AFF) 701; RL 621 is implemented by means of node request flip-flop (NRFF) 703; and NGL 625 is implemented by means of AND gate 711 and, in accordance with the invention, a programmable node grant counter NGCNT 720. The previous discussion as to the operation of the node logic shown in FIG. 7 applies in general also to the embodiment shown in FIG. 8 and will not be repeated. Instead only that portion of the logic that differs is discussed in detail.

The implementations of RL 621 and NGL 625 are straightforward. RL 621 consists of NRFF 703, which receives and retains NR signal 619(1) indicating that a component represented by node 603(1) has made a request. NOT RES 721(1) permits resetting NRFF 703(1) when the request has been serviced. NGL logic 625 includes AND gate 711(1), NGCNT 720(1) and inverter 724(1). AND gate 711(1) requires that NRFF 703(1) indicates a request, that neither BUSY nor LOCK is being asserted in system bus 104, and that output 707(1) indicates that node 603(1) may access the bus, either because no preceding node wants to access it or because node 603(1) is the current anchor node. If all of these conditions are met an enable count (ENA) input of NGCNT 720(1) is asserted and during a bus access cycle a transition of a clock signal (MEMCLK) causes NGCNT 720(1) to increment by one count.

Further in accordance with this aspect of the invention NGCNT 720(1) increments for each access to the bus, NGCNT 720(1) incrementing from some initially programmed value until a count of 15 ($F_{16}$) is reached. At this time a terminal count (TC) output of NGCNT 720(1) goes high, generating the signal NG 629(1). NG 629(1) being asserted causes an anchor out signal to be generated and applied to a next node in the priority chain. NG 629(1) is also inverted and fed back by inverter 724(1) and is applied to an active low load (LD) input of NGCNT 720(1). The low signal applied to the LD input causes NGCNT 720(1) to load the digital value appearing on lines 722(1) and to thereby preset NGCNT 720(1) to a predetermined value. Presetting NGCNT 720(1) to the predetermined value, other than 15, also causes the TC output to go low, removing the NG629(1) signal. Lines 722(1) may be sourced from manually set switches, hardwired jumpers or may be sourced from a latch or register (not shown) whereby the value may be programmed and changed, if desired, under a user's or an operating system's control. As can be appreciated, the value that is preset into the counter NGCNT 720(1) determines how many bus accesses the present highest priority anchor node is allowed before the highest priority is passed to a next requesting node in the chain of nodes. By example, if NGCNT 720(1) is preset to a value of seven then the node is granted eight consecutive bus accesses (15−7) before the highest priority is passed to the next requesting node. Of course, NGCNT 720(1) may be embodied in other than a four bit counter. For example, if NGCNT 720(1) were embodied in an eight bit counter up to 255 memory accesses could be made by the node before priority was rotated to another node. It should also be realized that the output of the counter could be compared to a digital value by a comparator circuit for determining when the programmed number of bus accesses have expired. That is, a number of possible hardware embodiments can be envisaged for realizing the desired result.

The foregoing discussion has disclosed how one skilled in the art may construct a dynamic circular priority chain in which the priority of a node with regard to access to a bus in a computer system is determined by its position on the circle relative to a current anchor node and in which the current anchor node changes after a predetermined number of accesses to the bus. In such a dynamic circular priority chain, no node can "hog" the bus, and at the same time, any node can have immediate access to the bus if there is no node with higher priority requesting access. Moreover, the time to determine which node will receive access is no more than that required for a priority signal to propagate through priority logic implemented by means of single gate in each node.

While the foregoing description has disclosed the best mode presently known to the inventor for implementing the invention, other implementations are possible, including ones in which no separate line is required for the anchor logic and ones in which an access to SB 104 by a node results in the next node following that node becoming the anchor node. Thus, the present embodiments are to be considered in all respects as illustrations and not restrictive, the scope of the invention being indicated by the appended claims rather that the foregoing description, and all changes which come within the meaning and range of equivalency of the claims are intended to be embraced therein.

What is claimed is:

1. Apparatus for determining priority of access to a bus among a set of devices coupled to the bus, each device being represented for priority purposes by a node in a group of nodes, each node being coupled to the bus and receiving a priority line from a first adjacent node and providing a priority line to a second adjacent node and having a priority relative to a single node with the highest priority, the priority determining apparatus comprising in each node:
   priority logic means for permitting access to the represented device if no higher priority node has requested access; and
   highest priority node specification means responsive to the bus for specifying whether the node is presently the highest priority node and, if the node is presently the highest priority node, dynamically giving the highest priority to another of the nodes in response to a predetermined number of accesses of the bus by one of the set of devices.

2. The apparatus set forth in claim 1 and wherein:
   the node has the lowest priority after the highest priority node specification means gives the highest priority to another of the nodes.

3. The apparatus set forth in claim 1 and wherein:
   the highest priority node specification means gives the highest priority to a node having the next highest priority.

4. Apparatus for determining priority of access to a bus among a set of devices coupled to the bus, each device being represented for priority purposes by a node in a group of nodes, each node being coupled to the bus and receiving a priority line from a first adjacent node and providing a priority line to a second adjacent node and having a priority relative to a single node with the highest priority, the priority determining apparatus comprising in each node;

priority logic means for permitting access to the represented device if no higher priority node has requested access; and highest priority node specification means responsive to the bus for specifying whether the node is presently the highest priority node and, if the node is presently the highest priority node, dynamically giving the highest priority to another of the nodes in response to a predetermined number of accesses of the bus by one of the set of devices, wherein the highest priority node specification means includes counter means for counting a number of accesses to the bus and, responsive to a programmed value, gives the highest priority to another node on a next access by a node to the bus.

5. The apparatus set forth in claim 1 and wherein:

the group of nodes is configured as a circle for purposes of determining priority; and the priority of a node is determined from the node's position in the circle relative to the highest priority node.

6. The apparatus as set forth in claim 5 and wherein:

the priority of the node is determined by the number of nodes between the node and the highest priority node in a preselected direction around the circle, with priority decreasing as the number of nodes increases.

7. The apparatus set forth in claim 6 and wherein:

the highest priority node specification means gives the highest priority to the adjacent node in the direction of decreasing priority.

8. The apparatus set forth in claim 5 and wherein:

the highest priority node specification means gives the highest priority to an adjacent node in the circle.

9. The apparatus set forth in claim 1 and wherein:

the group of nodes is configured as a circle for purposes of determining priority;

the priority logic means in each node includes preceding request value receiving means for receiving from the priority logic means of the immediately preceding node in a predetermined direction around the circle a request value which is in the alternative a first request value indicating that a preceding node beginning at the highest priority node has requested access to the bus and a second request value indicating that no preceding node has requested access, preceding request value providing means for providing in the alternative the first or second request value to the priority logic means of the immediately succeeding node, and priority value receiving means for receiving from the highest priority node specification means a priority value which is in the alternative a first priority value indicating that the node has the highest priority and a second priority value indicating that the node does not have the highest priority; and the priority logic means operates responsively to the received request value, the received priority value, and any bus access request to respond to the absence of a bus access request and to any received request value by providing a request value equal to the received request value; respond to the presence of a bus access request and a received second request value by providing the first request value and permitting access to the bus, respond to the presence of a bus access request and a received first request value and the second priority value by providing the first request value without permitting access to the bus, and respond to the presence of a bus access request, a received first request value and the first priority value by providing the first request value and permitting access to the bus.

10. The apparatus set forth in claim 9 and wherein:

the highest priority node specification means includes preceding priority value receiving means for receiving the priority value specified by the immediately preceding node's highest priority node specification means, preceding priority value providing means for providing the priority value specified by the node's highest priority node specification means to the immediately following node, and bus access signal receiving means connected to the bus for determining when an access of the bus by one of the nodes has occurred; and the highest priority node specification means sets the priority value to the priority value received on the preceding priority value receiving means when the bus access signal receiving means determines that an access of the bus has occurred.

11. Apparatus for determining priority of access to a bus among a set of devices coupled to the bus comprising:

a group of nodes, each node representing a device and having a priority and being responsive to requests to access the bus from the represented device to provide access if no device represented by a node with higher priority has requested access;

means for giving a single one of the nodes the highest priority;

means for giving the highest priority to a different node in response to a predetermined number of accesses of the bus by a device; and means for determining the priority of each node relative to the highest priority node.

12. The apparatus set forth in claim 11 and wherein:

the means for determining the priority of each node relative to the node currently having the highest priority is a circular configuration of the nodes wherein the priority of a given node is determined by the node's position relative to the highest priority node.

13. The apparatus set forth in claim 12 and wherein:

the means for giving the highest priority to a different node gives the highest priority to an adjacent node in the circle.

14. The apparatus set forth in claim 13 and wherein:

the priority of a given node in the circular configuration is determined by the number of nodes between the node and the highest priority node in a preselected direction around the circle, with priority decreasing as the number of nodes increases; and the means for giving the highest priority to a different node gives the highest priority to the adjacent node in the direction of decreasing priority.

15. A method for determining priority of access to a bus among a set of devices coupled to the bus, each device being represented for priority purposes by a node in a group of nodes and each node having a priority relative to a single node currently having the highest priority, the method comprising the steps of:
- receiving an access request in a node from a represented device;
- determining whether any node with a higher priority has received an access request;
- if no such node has received an access request, permitting the device to access the bus;
- counting a number of accesses by the device to the bus; and
- in response to predetermined number of accesses to the bus, giving another node the highest priority.

16. A method as set forth in claim 15 and including an initial step of providing a value indicating a predetermined number of accesses that the device may make to the bus.

17. A method as set forth in claim 16 wherein the step of providing is accomplished by loading a digital value into a presettable counter means.

18. A method as set forth in claim 17 wherein the step of counting includes a step of incrementing the presettable counter means for each access by the device to the bus.

19. A method as set forth in claim 18 wherein the step of giving another node the highest priority occurs when the presettable counter means generates a terminal count output.

* * * * *

(12) EX PARTE REEXAMINATION CERTIFICATE (8433rd)
United States Patent
Whipple

(10) Number: US 5,077,733 C1
(45) Certificate Issued: Aug. 2, 2011

(54) PRIORITY APPARATUS HAVING PROGRAMMABLE NODE DWELL TIME

(75) Inventor: David L. Whipple, Braintree, MA (US)

(73) Assignee: LG Electronics Inc., Dongan-Gu, Kyong Ki-Do (KR)

Reexamination Request:
No. 90/009,502, Aug. 12, 2009

Reexamination Certificate for:
Patent No.: 5,077,733
Issued: Dec. 31, 1991
Appl. No.: 07/405,792
Filed: Sep. 11, 1989

Related U.S. Application Data

(63) Continuation-in-part of application No. 07/317,100, filed on Feb. 28, 1989, now Pat. No. 4,926,419, which is a continuation-in-part of application No. 07/097,775, filed on Sep. 17, 1987, now abandoned, which is a continuation-in-part of application No. 06/712,492, filed on Mar. 15, 1985, now Pat. No. 4,719,622.

(51) Int. Cl.
G06F 13/36 (2006.01)
G06F 13/37 (2006.01)

(52) U.S. Cl. ........................................ 370/438; 370/462
(58) Field of Classification Search ........................ None
See application file for complete search history.

(56) References Cited

U.S. PATENT DOCUMENTS

| | | |
|---|---|---|
| 3,553,656 A | 1/1971 | Bernhardt |
| 3,840,859 A | 10/1974 | Vigil et al. |
| 4,009,470 A | 2/1977 | Danilenko et al. |
| 4,030,075 A | 6/1977 | Barlow |
| 4,059,851 A | 11/1977 | Nutter, Jr. et al. |
| 4,148,011 A | 4/1979 | McLagan et al. |
| 4,161,779 A | 7/1979 | Spencer et al. |
| 4,229,791 A | 10/1980 | Levy et al. |
| 4,271,465 A | 6/1981 | Ohtsuka et al. |
| 4,342,995 A | 8/1982 | Shima |
| 4,376,975 A | 3/1983 | Comfort et al. |
| 4,380,052 A | 4/1983 | Shima |
| 4,390,944 A | 6/1983 | Quackenbush et al. |
| 4,395,710 A | 7/1983 | Einolf, Jr. et al. |
| 4,408,300 A | 10/1983 | Shima |
| 4,412,286 A | 10/1983 | O'Dowd et al. |

(Continued)

FOREIGN PATENT DOCUMENTS

EP 0051425 A1 5/1982

(Continued)

OTHER PUBLICATIONS

Bantz, D.F. et al., Integration of Contention and Allocation for Multiaccess Busses, IBM Technical Disclosure Bulletin, vol. 20, No. 10, Mar. 1978, pp. 4248–4249.

(Continued)

*Primary Examiner* — Christopher E Lee

(57) ABSTRACT

Apparatus for determining priority of access to a bus by nodes in a group of nodes attached to the bus. For purposes of determining priority, the apparatus arranges the nodes in a circular configuration and selects one of the nodes as the "anchor node". The anchor node has the highest priority and the priorities of the other nodes are determined by their positions in the circle relative to the anchor node. Each node includes a presettable counter for indicating a number of times that a node may access the bus before the highest priority is rotated to another node. After a device represented by one of the nodes accesses the bus for a predetermined number of accesses the current anchor node ceases being the anchor node and the next node in the circle becomes the new anchor node. The priorities of the nodes change to reflect the new location of the anchor node.

At the time of issuance and publication of this certificate, the patent remains subject to pending reexamination control No. 90/008,522 filed Mar. 30, 2007. The claim content of the patent may be subsequently revised if a reexamination certificate issues from the reexamination proceeding.

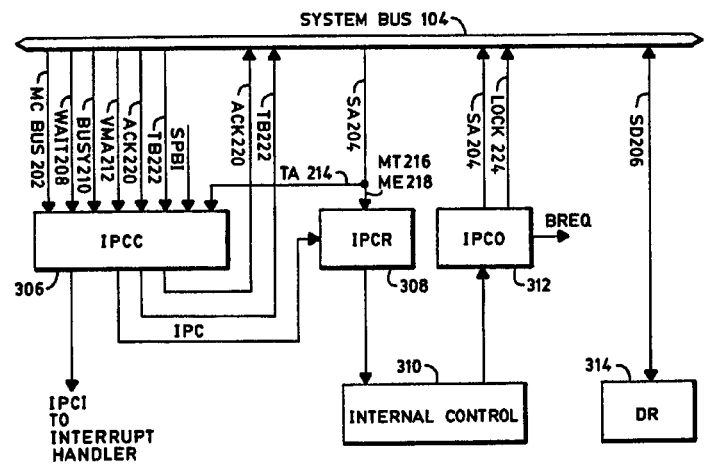

U.S. PATENT DOCUMENTS

| | | | |
|---|---|---|---|
| 4,429,405 | A | 1/1984 | Bux et al. |
| 4,449,183 | A | 5/1984 | Flahive et al. |
| 4,463,445 | A | 7/1984 | Grimes |
| 4,467,418 | A | 8/1984 | Quinquis |
| 4,470,112 | A | 9/1984 | Dimmick |
| 4,481,572 | A | 11/1984 | Ochsner |
| 4,486,852 | A | 12/1984 | Champlin et al. |
| 4,488,218 | A | 12/1984 | Grimes |
| 4,488,232 | A | 12/1984 | Swaney et al. |
| 4,493,036 | A | 1/1985 | Boudreau et al. |
| 4,495,573 | A | 1/1985 | Ballegeer |
| 4,499,538 | A | 2/1985 | Finger et al. |
| 4,543,629 | A | 9/1985 | Carey et al. |
| 4,558,412 | A | 12/1985 | Inoshita et al. |
| 4,574,350 | A | 3/1986 | Starr |
| 4,586,175 | A | 4/1986 | Bedard et al. |
| 4,621,342 | A | 11/1986 | Capizzi et al. |
| 4,628,311 | A | 12/1986 | Milling |
| 4,669,079 | A | 5/1987 | Blum |
| 4,677,612 | A | 6/1987 | Olson et al. |
| 4,682,282 | A | 7/1987 | Beasley |
| 4,719,567 | A | 1/1988 | Whittington |
| 4,719,622 | A | 1/1988 | Whipple et al. |
| 4,731,784 | A | 3/1988 | Keller et al. |
| 4,760,515 | A | 7/1988 | Malmquist et al. |
| 4,787,033 | A | 11/1988 | Bomba et al. |
| 4,920,486 | A | 4/1990 | Nielsen |
| 4,953,081 | A | 8/1990 | Feal et al. |
| 4,972,313 | A | 11/1990 | Getson |
| 4,974,148 | A | 11/1990 | Matteson |
| 5,016,162 | A | 5/1991 | Epstein et al. |
| 5,051,946 | A | 9/1991 | Cubranich et al. |
| 5,088,024 | A | 2/1992 | Vernon et al. |
| 5,119,292 | A | 6/1992 | Baker et al. |
| 5,274,774 | A | 12/1993 | Manber et al. |

FOREIGN PATENT DOCUMENTS

| | | |
|---|---|---|
| EP | 0063071 A1 | 10/1982 |
| EP | 0094180 A2 | 11/1983 |
| EP | 0097499 A2 | 1/1984 |
| EP | 0137609 A2 | 4/1985 |
| EP | 0138676 B1 | 4/1985 |
| GB | 2110847 | 6/1983 |
| JP | A-62-3364 | 1/1987 |
| WO | WO 8704825 | 8/1987 |

OTHER PUBLICATIONS

Alcock, E.W. et al., Interface Timeout, IBM Technical Disclosure Bulletin, vol. 22, No. 1, Jun. 1979, pp. 302–303.

Bantz, D.F. et al., Bus Architecture with Centralized Allocation and Decentralized Simplified Adaptive Channel Assignment, IBM Technical Disclosure Bulletin, vol. 22, No. 2, Jul. 1979, pp. 863–865.

Birch, F.T. et al., Priority Determination and Serving of I/O Devices, IBM Technical Disclosure Bulletin, Aug. 1973, pp. 874–876.

Janson, P.A., Multi–Access Medium Capture by Preamble Technique, IBM Technical Disclosure Bulletin, vol. 22, No. 8A, Jan. 1980, pp. 3364–3366.

Shen, Z., Performance Analysis of a CSMA/CD with Prioritized Access Waiting Time, Department of Wired Communications, Chang–chun University of Electro–Communications, IEEE, 1984, pp. 65–73.

Smolin, M., MicroStandards, IEEE Micro, Jun. 1988, pp. 5–7.

Samsen, G.R. et al., Bus Adapter Simplifies Interprocessor Communication, Computer Design, Dec. 1980, pp. 119–124.

Gustavson, D.B., Computer Buses—A Tutorial, IEEE Micro, Aug. 1984, pp. 7–22.

Gustavson, D.B., An Introduction to the Fastbus, Presented at the Conference on High Energy Physics and Nuclear Structure, University of British Columbia, Vancouver, B.C., Canada, Aug. 13–17, 1979, 8 pages.

Vernon, M.K. et al., Fairness Analysis of Microprocessor Bus Arbitration Protocols, Computer Science Department, University of Wisconsin–Madison, Sep. 1988, pp. 1–32.

Hojberg, K.S., One–Step Programmable Arbiters for Multiprocessors, Computer Design, Apr. 1978, pp. 154–158.

Thurber, K.J. et al., A Systematic Approach to the Design of Digital Bussing Structures, AFIPS Conference Proceedings, vol. 41, Part II, 1972 Fall Joint Computer Conference, Dec. 5–7, 1972, pp. 719–740.

Hirschman, A.D. et al. Standard Modules Offer Flexible Multiprocessor System Design, Computer Design, vol. 18, No. 5, May 1979, pp. 181–188.

Mikol, D., Constitution De Reseaux Locaux D'automates Repartis, Revue Generale De L'Electricite, No. 12, Dec. 1983, pp. 755–761.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 15-19 is confirmed.

Claims 1-14 were not reexamined.

* * * * *

(12) EX PARTE REEXAMINATION CERTIFICATE (9419th)
United States Patent
Whipple

(10) Number: US 5,077,733 C1
(45) Certificate Issued: Nov. 21, 2012

(54) PRIORITY APPARATUS HAVING PROGRAMMABLE NODE DWELL TIME

(75) Inventor: David L. Whipple, Braintree, MA (US)

(73) Assignee: LG Electronics Inc., Kyong Ki-Do (KR)

Reexamination Request:
No. 90/008,522, Mar. 30, 2007

Reexamination Certificate for:
Patent No.: 5,077,733
Issued: Dec. 31, 1991
Appl. No.: 07/405,792
Filed: Sep. 11, 1989

Related U.S. Application Data

(63) Continuation-in-part of application No. 07/317,100, filed on Feb. 28, 1989, now Pat. No. 4,926,419, which is a continuation-in-part of application No. 07/097,775, filed on Sep. 17, 1987, now abandoned, which is a continuation-in-part of application No. 06/712,492, filed on Mar. 15, 1985, now Pat. No. 4,719,622.

(51) Int. Cl.
*G06F 13/36* (2006.01)
*G06F 13/37* (2006.01)

(52) U.S. Cl. .................................. 370/438; 370/462

(58) Field of Classification Search .................. 710/111, 710/107, 112, 116
See application file for complete search history.

(56) References Cited

To view the complete listing of prior art documents cited during the proceeding for Reexamination Control Number 90/008,522, please refer to the USPTO's public Patent Application Information Retrieval (PAIR) system under the Display References tab.

*Primary Examiner* — Anjan K. Deb

(57) ABSTRACT

Apparatus for determining priority of access to a bus by nodes in a group of nodes attached to the bus. For purposes of determining priority, the apparatus arranges the nodes in a circular configuration and selects one of the nodes as the "anchor node". The anchor node has the highest priority and the priorities of the other nodes are determined by their positions in the circle relative to the anchor node. Each node includes a presettable counter for indicating a number of times that a node may access the bus before the highest priority is rotated to another node. After a device represented by one of the nodes accesses the bus for a predetermined number of accesses the current anchor node ceases being the anchor node and the next node in the circle becomes the new anchor node. The priorities of the nodes change to reflect the new location of the anchor node.

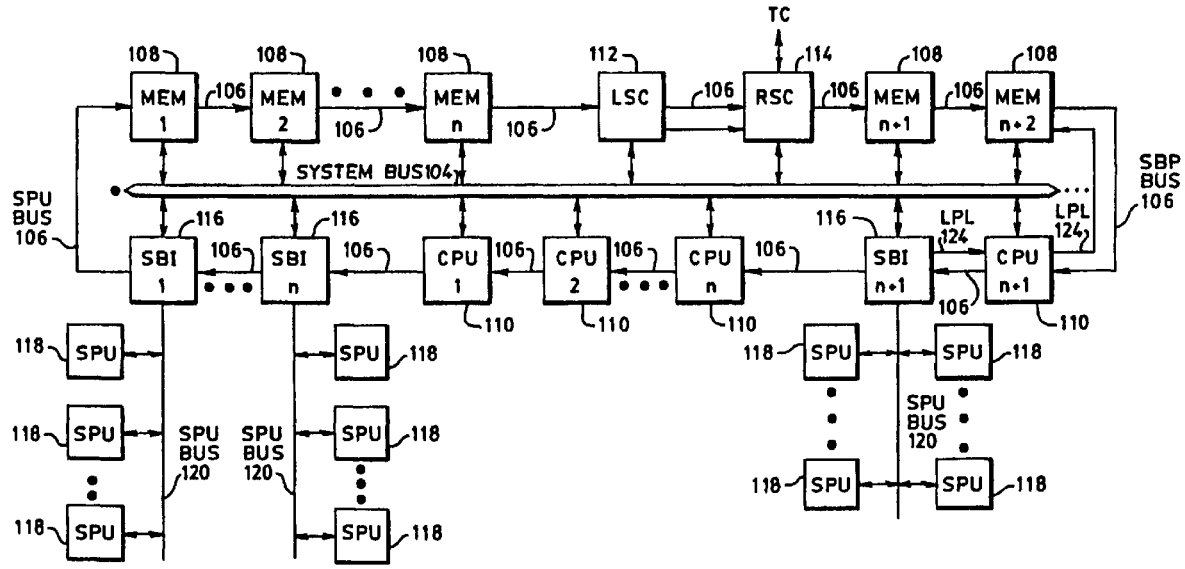

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 11-17 are cancelled.
Claims 1-10, 18 and 19 were not reexamined.

* * * * *